(12) United States Patent
Koyama

(10) Patent No.: US 7,505,909 B2
(45) Date of Patent: Mar. 17, 2009

(54) DEVICE CONTROL DEVICE AND DEVICE CONTROL METHOD

(75) Inventor: Rika Koyama, Hyogo (JP)

(73) Assignee: Kabushikikaisha Kenwood, Tokyo (JP)

( * ) Notice: Subject to any disclaimer, the term of this patent is extended or adjusted under 35 U.S.C. 154(b) by 16 days.

(21) Appl. No.: 10/581,822

(22) PCT Filed: Dec. 6, 2004

(86) PCT No.: PCT/IB2004/004006

§ 371 (c)(1),
(2), (4) Date: Feb. 14, 2007

(87) PCT Pub. No.: WO2005/062296

PCT Pub. Date: Jul. 7, 2005

(65) Prior Publication Data

US 2007/0239443 A1 Oct. 11, 2007

(30) Foreign Application Priority Data

Dec. 5, 2003 (JP) .............................. 2003-406712

(51) Int. Cl.
*G10L 21/00* (2006.01)
(52) U.S. Cl. ................... 704/275; 704/270; 704/231; 704/240; 340/825.72; 340/5.72; 340/5.1
(58) Field of Classification Search ............. 704/231, 704/275, 246, 270, 240; 340/825.72, 5.72, 340/5.1
See application file for complete search history.

(56) References Cited

U.S. PATENT DOCUMENTS 6,584,439 B1 * 6/2003 Geilhufe et al. ............. 704/270

2002/0069063 A1 * 6/2002 Buchner et al. ............. 704/270
2002/0128846 A1 * 9/2002 Miller ........................ 704/275

FOREIGN PATENT DOCUMENTS

| EP | 0911808 A1 | 4/1999 |
|----|------------|--------|
| JP | 04-324312 | 11/1992 |
| JP | 2001-249685 | 9/2001 |
| JP | 2002-258892 | 9/2002 |

OTHER PUBLICATIONS

European Search Report of Application No. 04806317.6-2225 PCT IB2004004006, dated Jul. 30, 2007, 3 pages total.

* cited by examiner

*Primary Examiner*—Vijay B Chawan
(74) *Attorney, Agent, or Firm*—Townsend and Townsend and Crew LLP

(57) ABSTRACT

A language analyzer (2) performs speech recognition on a speech input by a speech input unit (1), specifies a possible word which is represented by the speech, and the score thereof, and supplies word data representing them to an agent processing unit (6). The agent processing unit (6) stores process item data which defines a data acquisition process to acquire word data or the like, a discrimination process, and an input/output process, and wires or data defining transition from one process to another and giving a weighting factor to the transition, and executes a flow represented generally by the process item data and the wires to thereby control devices belonging to an input/output target device group (5). To which process in the flow the transition takes place is determined by the weighting factor of each wire, which is determined by the connection relationship between a point where the process has proceeded and the wire, and the score of word data. The wire and the process item data can be downloaded from an external server.

8 Claims, 18 Drawing Sheets

| WIRE NUMBER Wn | PRECEDING NODE | FOLLOWING NODE | WEIGHTING FACTOR J |
|---|---|---|---|
| W1 = From | (TG01.1) To | (CN01.1), | 0.8 |
| W2 = From | (CN01.3) To | (EX01.1), | 0.24 |
| W3 = From | (CN01.2) To | (QB01.1), | 0.32 |
| W4 = From | (TG02.1) To | (EX03.1), | 0.7 |
| W5 = From | (QB01.3) To | (EX03.1), | 0.128 |
| W6 = From | (QB01.2) To | (EX02.1), | 0.224 |
| W7 = From | (EX02.2) To | (TG03.1), | 0.7 |

FIG.8

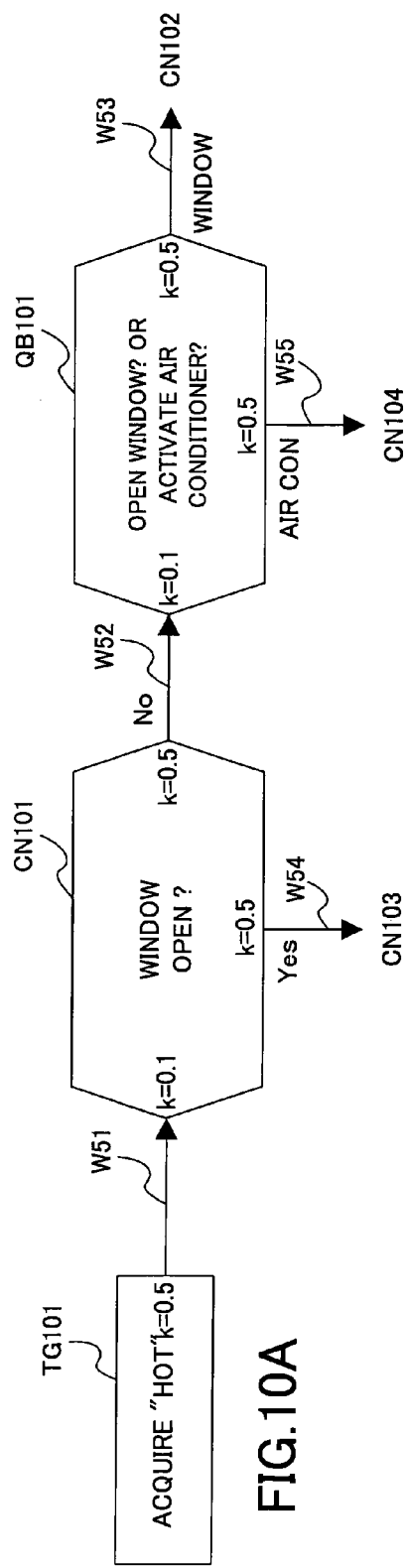
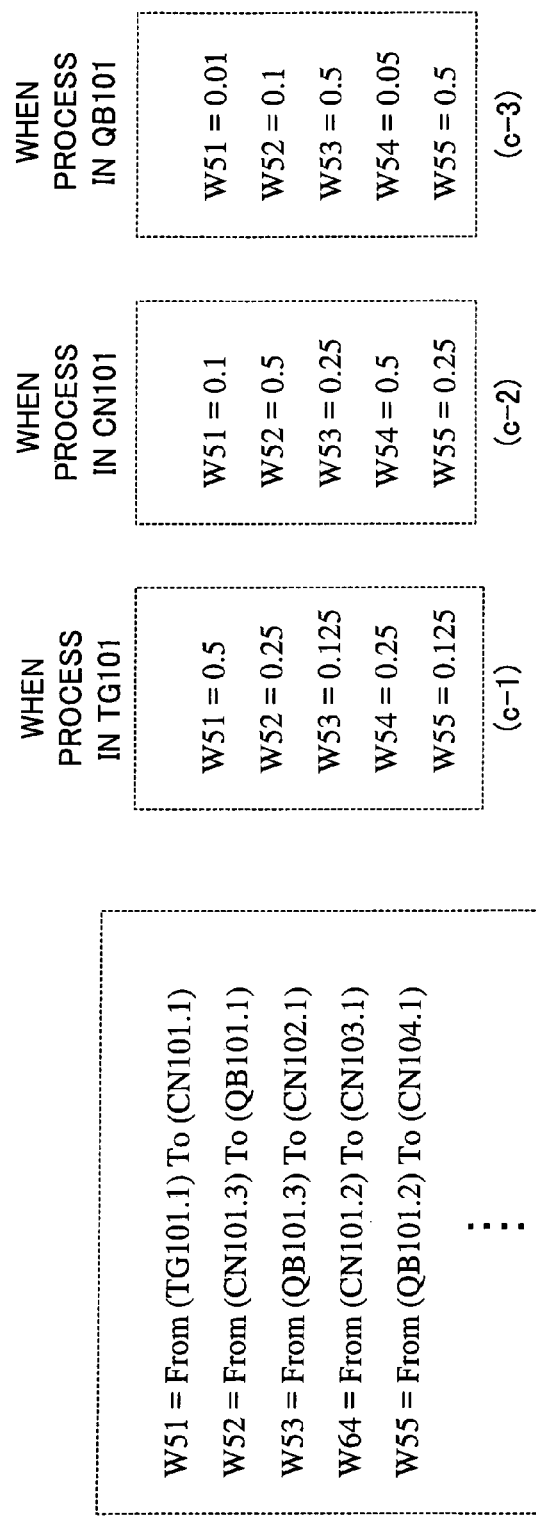
FIG.10A
FIG.10B
FIG.10C

DEVICE CONTROL DEVICE AND DEVICE CONTROL METHOD

Technical Field

The present invention relates to a device control device and a device control method.

BACKGROUND ART

Recently, schemes of recognizing speeches using a speech recognition technology, and controlling electric devices or the like in response to the recognition result are used. For example, as disclosed in Patent Literature 1, a scheme identifies a word represented by an input speech, discriminates whether the identified word matches a predetermined keyword or not, and controls an external device based on the discrimination result. Patent Literature 1: Unexamined Japanese Patent Application KOKAI Publication No. H4-324312

DISCLOSURE OF INVENTION

Problem to be Solved by the Invention

It is, however, difficult to completely recognize an instruction uttered in the form of a language by a human being. Accordingly, there is a case where the scheme cannot adequately respond to an instruction uttered in the form of a language by a human being.

MEANS FOR SOLVING THE PROBLEM

The present invention has been made in view of the above situation, and it is an object of the invention to provide a device control device and a device control method which can control a device adequately in response to an instruction uttered in the form of a language by a human being.

To achieve the object, a device control device according to a first aspect of the invention comprises speech recognition means that acquires speech data representing a speech, and performs speech recognition on the speech data, thereby specifying a candidate for a phrase represented by the speech, and device control means that specifies a variable to be changed to obtain a result desired by an utterer of the speech, a direction in which the variable is to be changed, and a device which is to be controlled to change the variable, based on the candidate specified by the speech recognition means and data indicating statuses of a plurality of external devices to be controlled, and controls the specified device in such a way as to change the specified variable in the specified direction, wherein the device control means controls a device when a number of devices which are controllable in such a way as to change the specified variable in the specified direction is one, and when there are a plurality of devices controllable in such a way as to change the specified variable in the specified direction, specifies which one of the controllable devices is desired to be operated based on a candidate specified by further acquisition of speech data by the speech recognition means, and controls the specified device.

When there are a plurality of devices controllable in such a way as to change the specified variable in the specified direction, the device control means may output data prompting determination of which one of the controllable devices is desired to be operated.

A device control method according to a second aspect of the invention comprises a speech recognition step of acquiring speech data representing a speech, and performing speech recognition on the speech data, thereby specifying a candidate for a phrase represented by the speech, and a device control step of specifying a variable to be changed to obtain a result desired by an utterer of the speech, a direction in which the variable is to be changed, and a device which is to be controlled to change the variable, based on the candidate specified by the speech recognition step and data indicating statuses of a plurality of external devices to be controlled, and controlling the specified device in such a way as to change the specified variable in the specified direction, wherein in the device control step, a device is controlled when a number of devices which are controllable in such a way as to change the specified variable in the specified direction is one, and when there are a plurality of devices controllable in such a way as to change the specified variable in the specified direction, which one of the controllable devices is desired to be operated is specified based on a candidate specified by further acquisition of speech data by the speech recognition means, and the specified device is controlled.

A computer program according to a third aspect of the invention allows a computer to execute a speech recognition step of acquiring speech data representing a speech, and performing speech recognition on the speech data, thereby specifying a candidate for a phrase represented by the speech; and a device control step of specifying a variable to be changed to obtain a result desired by an utterer of the speech, a direction in which the variable is to be changed, and a device which is to be controlled to change the variable, based on the candidate specified by the speech recognition step and data indicating statuses of a plurality of external devices to be controlled, and controlling the specified device in such a way as to change the specified variable in the specified direction, wherein in the device control step, a device is controlled when a number of devices which are controllable in such a way as to change the specified variable in the specified direction is one, and when there are a plurality of devices controllable in such a way as to change the specified variable in the specified direction, which of the controllable devices is desired to be operated is specified based on a candidate specified by further acquisition of speech data by the speech recognition means, and the specified device is controlled.

EFFECT OF THE INVENTION

The present invention realizes a device control device and a device control method which can control a device adequately in response to an instruction uttered in the form of a language by a human being.

BRIEF DESCRIPTION OF DRAWINGS

[FIG. 8] A diagram showing wires.

[FIG. 10] A diagram for explaining setting of a weighting factor.

Figure 1:
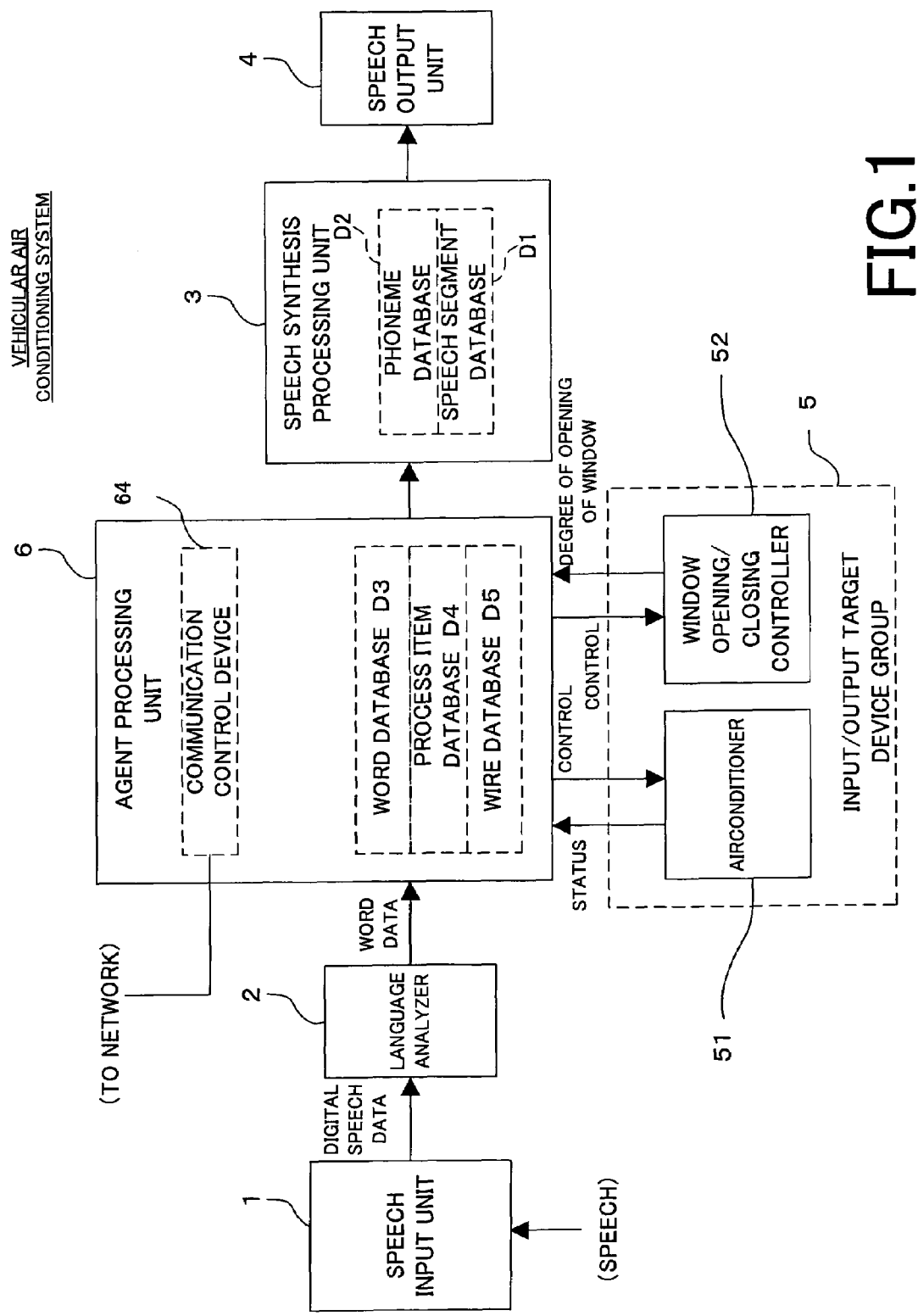
[FIG. 1] A diagram showing a vehicular air conditioning system according to an embodiment of the present invention.

EXPLANATION OF REFERENCE NUMERALS 1 speech input unit
2 language analyzer
3 speech synthesis processing unit
4 speech output unit
5 input/output target device group
51 air conditioner
52 window opening/closing controller
6 agent processing unit

BEST MODE FOR CARRYING OUT THE INVENTION

An embodiment of the present invention will be explained below, taking a vehicular air conditioning system provided in a vehicle as an example, by referring to the accompanying drawings.

Figure 2:
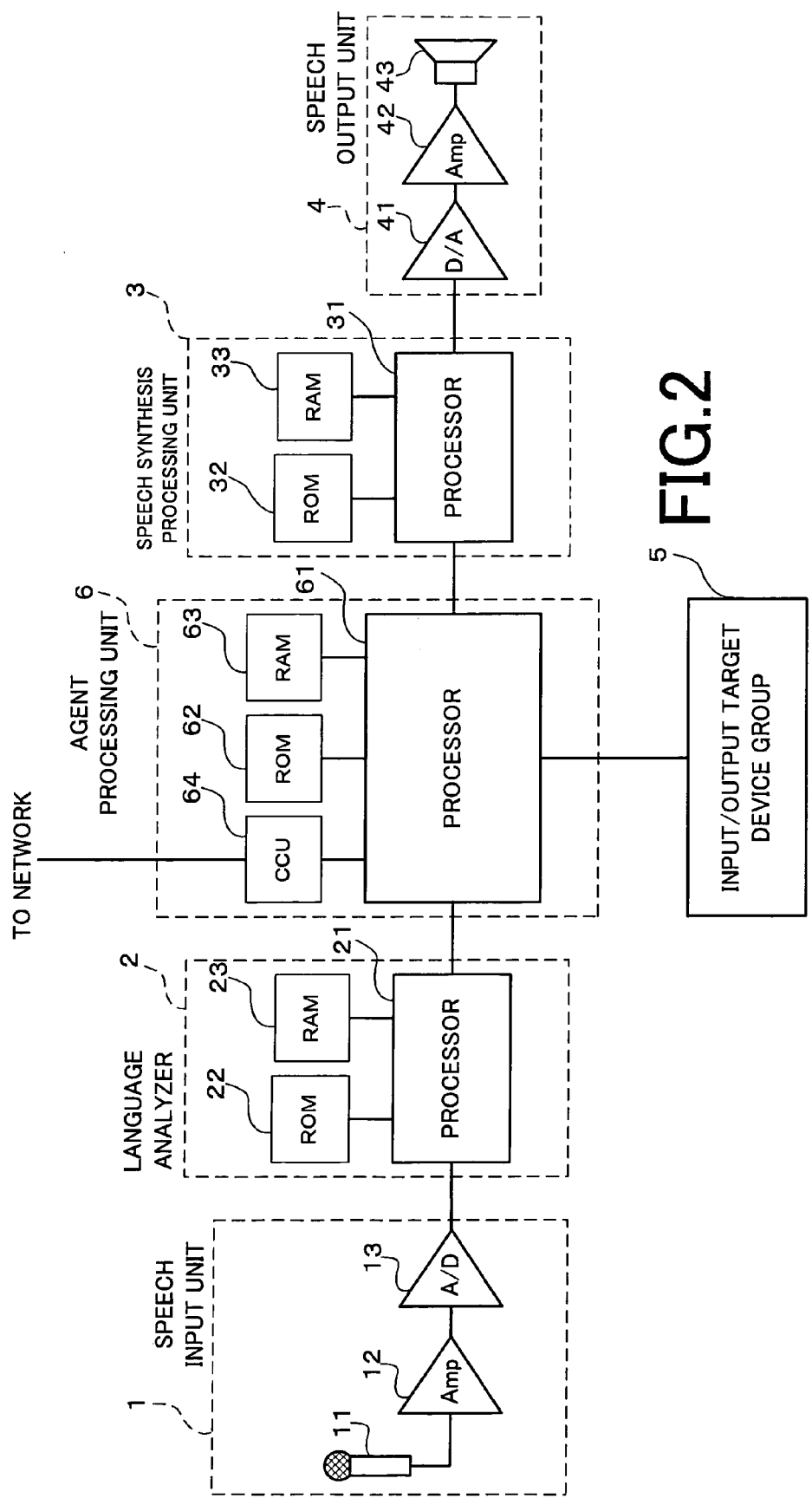
[FIG. 2] A more detailed structural diagram of the vehicular air conditioning system according to the embodiment.

FIG. 1 is a block diagram showing the structure of the vehicular air conditioning system. FIG. 2 is a block diagram showing examples of the physical structures of individual sections.

As shown in FIG. 1, the vehicular air conditioning system comprises a speech input unit 1, a language analyzer 2, a speech synthesis processing unit 3, a speech output unit 4, an input/output target device group 5, and an agent processing unit 6.

The speech input unit 1 inputs a speech, generates speech data of a digital form from the input speech, and supplies the speech data to the language analyzer 2. Specifically, the speech input unit 1 comprises, for example, a microphone 11, an AF (Audio Frequency) amplifier 12, and an A/D (Analog-to-Digital) converter 13 incorporating a sample and hold circuit as shown in FIG. 2. The microphone 11 converts a speech to a speech signal, and outputs the signal. The AF amplifier 12 amplifies the speech signal from the microphone 11, and outputs the signal. The A/D converter 13 performs sampling and A/D conversion on the amplified speech signal from the AF amplifier 12, generates digital speech data, and supplies the data to the language analyzer 2.

As shown in FIG. 2, each of the language analyzer 2, the speech synthesis processing unit 3 and the agent processing unit 6 comprises a processor 21, 31, 61 comprising, for example, a CPU (Central Processing Unit), a non-volatile memory 22, 32, 62, such as a hard disk drive, which stores a program to be run by the processor 21, 31, 61, and a volatile memory 23, 33, 63, such as a RAM (Random Access Memory), which has a memory area to be a work area for the processor. A part or all of the functions of the language analyzer 2, the speech synthesis processing unit 3, and the agent processing unit 6 may be achieved by a single processor, or a single non-volatile memory and a single volatile memory.

The language analyzer 2 performs a speech recognition process on speech data supplied from the speech input unit 1. Through the speech recognition process, the language analyzer 2 specifies a candidate for a word represented by the speech data, and the likelihood (score) of the candidate. The scheme for speech recognition is arbitrary. A plurality of candidates may be specified for a word. The language analyzer 2 generates data indicating a specified candidate and the score of the candidate (hereinafter, called word data), and supplies them to the agent processing unit 6.

The non-volatile memory 32 of the speech synthesis processing unit 3 stores a speech segment database D1 which stores data representing waveforms of words, and a phoneme database D2 which stores waveform data for constituting waveforms of phonemes.

The speech segment database D1 stores data representing waveforms of words. The phoneme database D2 stores waveform data for constituting phonemes. The speech synthesis processing unit 3 generates digital speech data representing a speech reading out text data supplied from the agent processing unit 6 by using the data stored in the speech segment database D1 and/or the phoneme database D2.

The speech synthesis processing unit 3 supplies the generated speech data to the speech output unit 4. The scheme of generating digital speech data is arbitrary, for example, slot filling method and rule-based synthesis (Rule-based synthesis) can be used. The slot filling method is a method by which, for example, word-by-word speeches are read by an announcer, and are linked together and output. The rule-based synthesis is a method by which relatively small units, such as phonemes (consonants or vowels) or kana, are linked together and output.

The speech output unit 4 reproduces a speech representing digital speech data supplied from the speech synthesis processing unit 3. More specifically, the speech output unit 4 has a D/A (Digital-to-Analog) converter 41, an AF amplifier 42, and a speaker 43 as shown in FIG. 2. The D/A converter 41 performs D/A conversion on digital speech data to convert the data to an analog speech signal. The AF amplifier 42 amplifies the analog speech signal. The speaker 43 vibrates in accordance with the analog speech signal, reproduces and outputs a speech represented by the analog speech data.

The input/output target device group 5 comprises, for example, an air conditioner 51, and a window opening/closing controller 52.

The air conditioner 51 performs a cooling, a heating or a fanning operation in accordance with a control signal. The air conditioner 51 outputs data representing its operational status, e.g., status data indicating in which one of statuses, a cooling operation, a heating operation, temperature adjustment to a set temperature, a fanning operation, and at rest, the air conditioner is.

The window opening/closing controller 52, which opens or closes a window according to a control signal, includes a motor, a control circuit that controls rotation and stopping of the motor according to a control signal, and a winch that moves a window frame. The control circuit of the window opening/closing controller 52 outputs data representing the operation status of the window opening/closing controller 52, e.g., data indicating the amount (degree; the degree of opening) of the window open.

The agent processing unit 6 has a communication controller 64 comprising a modem and a packet communication terminal, and is connected to a distribution server 100 to be discussed later over an external network (e.g., the Internet via a wireless telephone circuit) via the communication controller.

The non-volatile memory 62 of the agent processing unit 6 stores a word database D3. The word database D3 stores data of a plurality of words and one or more flags for word grouping indicating a plurality of word groupings in association with one another.

Individual flags associated with a single word are grouped in association with certain concepts. When a flag indicates a predetermined value (hereinafter, let the value be "1"), a word associated with the flag is grouped into a group associated with the flag. When the flag indicates another value (for example, "0"), the word is not grouped into the group associated with the flag.

Figure 3:
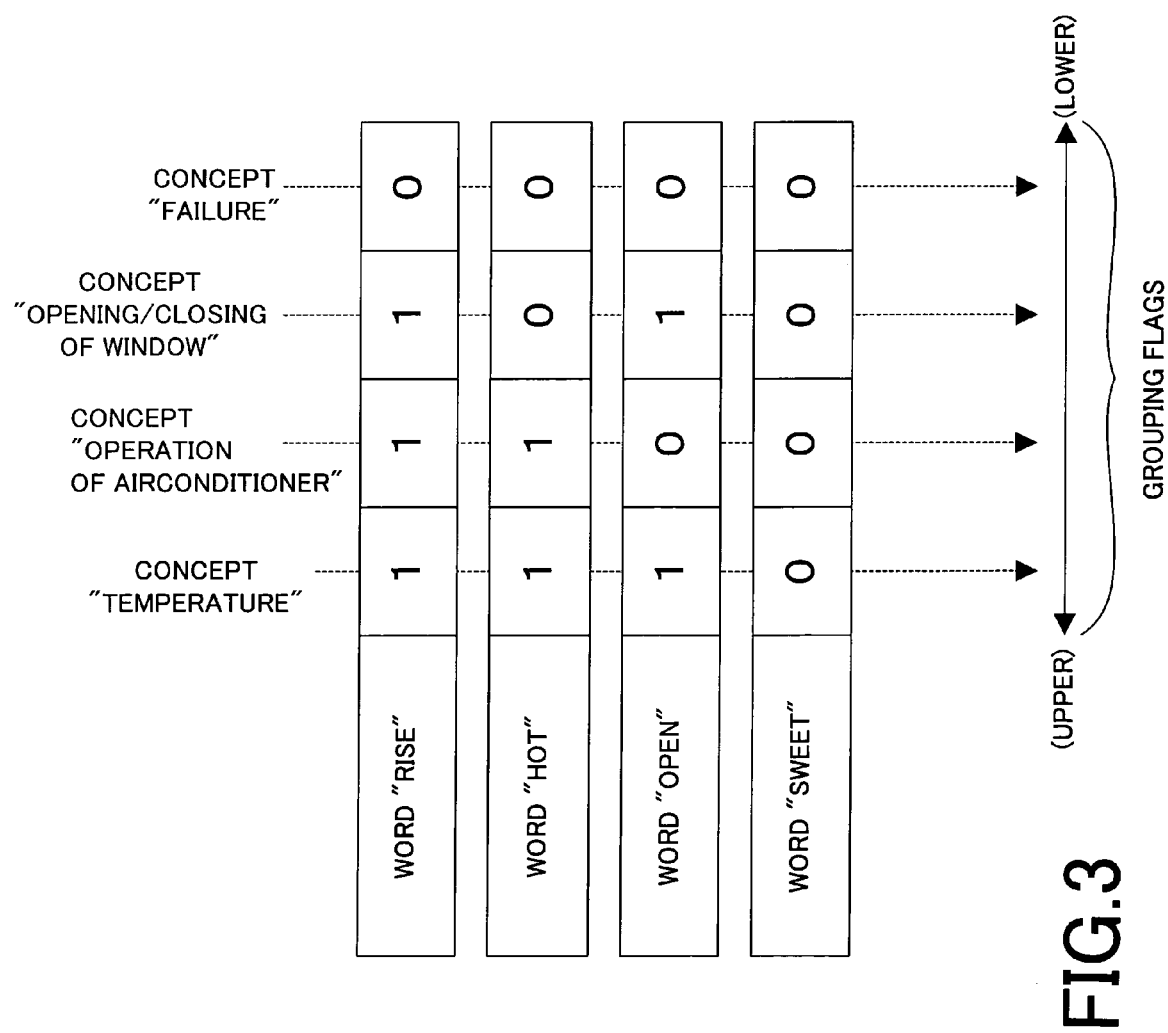
[FIG. 3] A diagram exemplarily showing a specific example of grouping flags.

FIG. 3 is a diagram exemplarily showing a specific example of grouping flags.

In the example of FIG. 3, word grouping flags of four bits are associated with each of words "rise", "hot" and "open".

The most significant bit (MSB) flag in the 4-bit bit group is associated with a concept "temperature". The second bit flag from the MSB is associated with a concept "operation of air conditioner". The third bit flag from the MSB is associated with a concept "opening/closing of window". The least significant bit flag is associated with a concept "failure".

As illustrated, the value of the 4 bit flag group associated with the word "rise" is a binary number "1110", the value of the flag group associated with the word "hot" is a binary number "1100", and the value of the flag group associated with the word "open" is a binary number "1010".

In this case, the flag groups indicate that the words "rise", "hot" and "open" are grouped under the concept "temperature", the words "rise" and "hot" are grouped under the concept "operation of air conditioner", the words "hot" and "open" are grouped under the concept "opening/closing of window", and none of the words "rise", "hot" and "open" are grouped under the concept "failure".

The individual words and the individual concepts are used as discrimination conditions for individual process items stored in a process item database D4.

The non-volatile memory of the agent processing unit 6 further stores the process item database D4 and a wire database D5.

The process item database D4 is a database storing data (process item data) which describes the contents of various processes to be executed by the agent processing unit 6, e.g., a trigger acquisition process (TGxx), a discrimination process (Cnxx or QBxx), and an input/output process (EXxx to be discussed later), process item (pointer) by process item. Note that "xx" is an identification number.

Of the process items stored in the process item database D4, data describing the contents of the "trigger acquisition process (TGxx)" includes trigger data (data designating the contents of data to be acquired as a trigger) which specifies a trigger to start those processes and a transition constant k for determining the progress direction to be discussed later (a constant which indicates the degree of transition constant in the progress direction and becomes a calculation standard for a weighting factor J to be described later).

Trigger data is arbitrary, and is, for example, data indicating in which one of the statuses, a cooling operation, a heating operation, temperature adjustment to a set temperature, a fanning operation, and at rest, the air conditioner is, data indicating the amount of a window open, data indicating the temperature in a room, or the aforementioned word data supplied from the language analyzer 2. Alternatively, trigger data may be data which is given from the process the agent processing unit 6 itself executes. When trigger data (data which is acquired in the trigger acquisition process) is word data, it may be data indicating the "concept" that is assigned to the group to which a word represented by the word data belongs. It is to be noted that, as discussed later, the contents of the trigger acquisition process are described in such a way that a plurality of trigger acquisition processes do not acquire word data representing the same word.

Figure 4A:
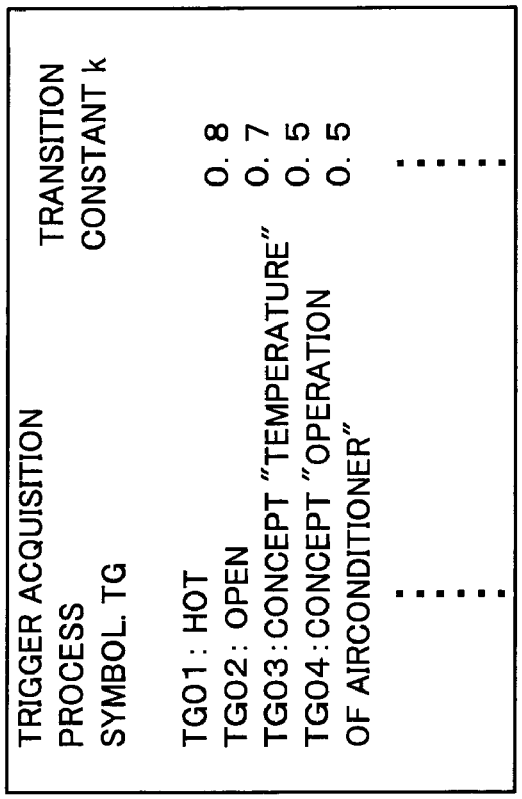
[FIG. 4] A diagram for explaining a trigger acquisition process.
Figure 4B:
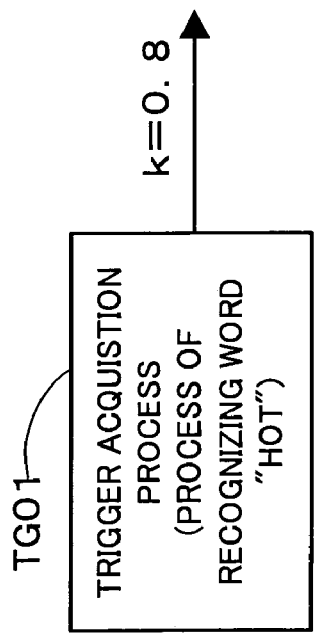

FIG. 4(a) shows an example of a trigger acquisition process TGxx. In this example, a trigger TG01 is a process of acquiring the word "hot" as a trigger (identifying the word "hot"), and the transition constant k for determining whether or not to proceed (transition) to a process following that process is 0.8. FIG. 4(b) illustrates a flowchart for a trigger acquisition process TG01. A trigger acquisition process TG02 is a process of acquiring the word "open". A trigger acquisition process TG03 is a process of acquiring a word belonging to a group associated with the concept "temperature" (acquiring one of "rise", "hot" and "open" in FIG. 3). TG04 is a process of a word belonging to a group associated with the concept "operation of air conditioner" (acquiring either "rise" or "hot" in FIG. 3).

Data describing the contents of a "discrimination process (Cnxx)" stored in the process item database D4 includes data which describes a discrimination condition, a list of possible results as discrimination results, and a transition constant k in a return direction to be discussed later for each discrimination process. Data describing the contents of a discrimination process includes data describing a transition constant k in a progress direction to determine the progress direction for each discrimination result.

Figure 5A:
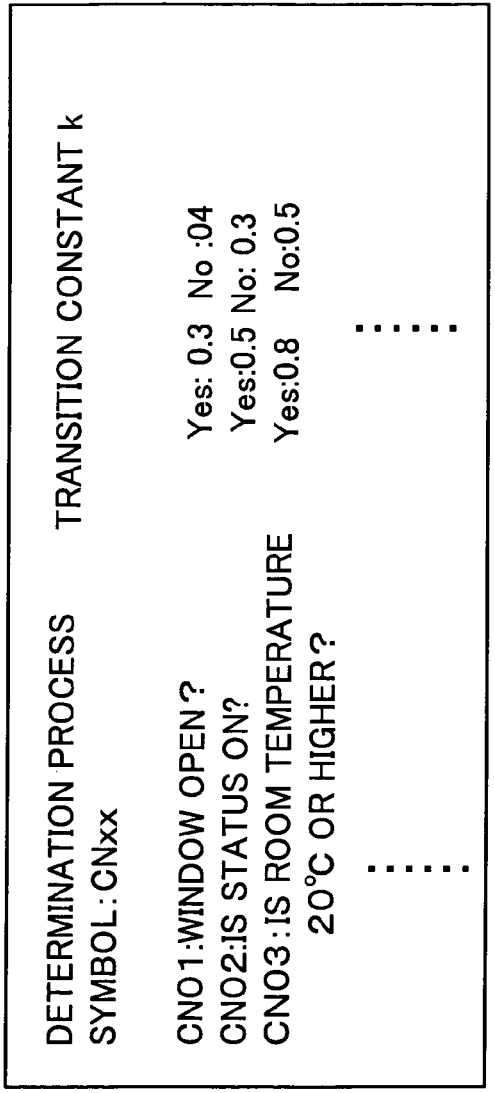
[FIG. 5] A diagram for explaining a discrimination process.
Figure 5B:
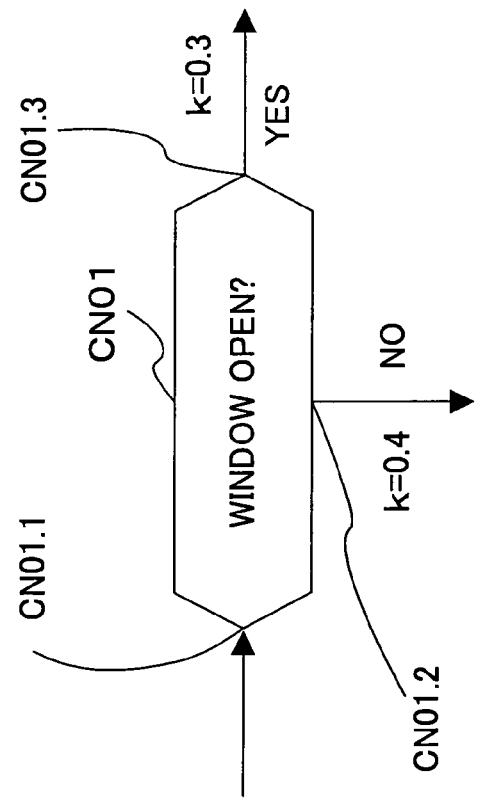

FIG. 5(a) shows an example of a discrimination process CNxx. In this example, a discrimination process CN01 is a "process of discriminating whether a window is open or not", and the transition constant k for determining whether or not to proceed to a following process when it is discriminated as open is 0.3, while the transition constant k for determining whether or not to proceed to a following process when it is not discriminated as open is 0.4. FIG. 5(b) illustrates a flowchart for this example. A node CN01.1 shown in FIG. 5(b) is a start node indicating the start point of the process, a node CN01.2 is a node in the progress direction when it is discriminated that "a window is closed", and the transition constant k is 0.4. Further, a node CN01.3 is a node in the progress direction when it is discriminated that a window is open, and the transition constant k is 0.3. A discrimination process CN02 is a process of discriminating whether the status of the air conditioner 51 is on (in operation) or not, and the transition constant k for determining whether or not to proceed to a following process when it is discriminated as being in operation is 0.5, while the transition constant k when it is discriminated that the air conditioner is OFF (not operating) is 0.3.

In the "discrimination process", data to be used in discrimination may be acquired from an arbitrary acquisition source. Possible acquisition sources include, for example, other processes to be executed by the language analyzer 2 and the agent processing unit 6, devices (sensors) belonging to the input/output target device group 5, and other external devices. In this case, data which describes the contents of the discrimination process may further include, for example, data specifying an acquisition source for data to be used in discrimination.

In the "discrimination process", predetermined data may be output to a predetermined output destination prior to discrimination (in which case, a symbol indicating the process is, for example, QBxx). For example, sending data representing a predetermined inquiry to the speech synthesis processing unit 3 prior to discrimination, or the like is possible. In a case where predetermined data is output in the discrimination process prior to discrimination, data which describes the contents of the discrimination process includes, for example, the contents of data to be output and data designating the output destination of the data.

Figure 6A:
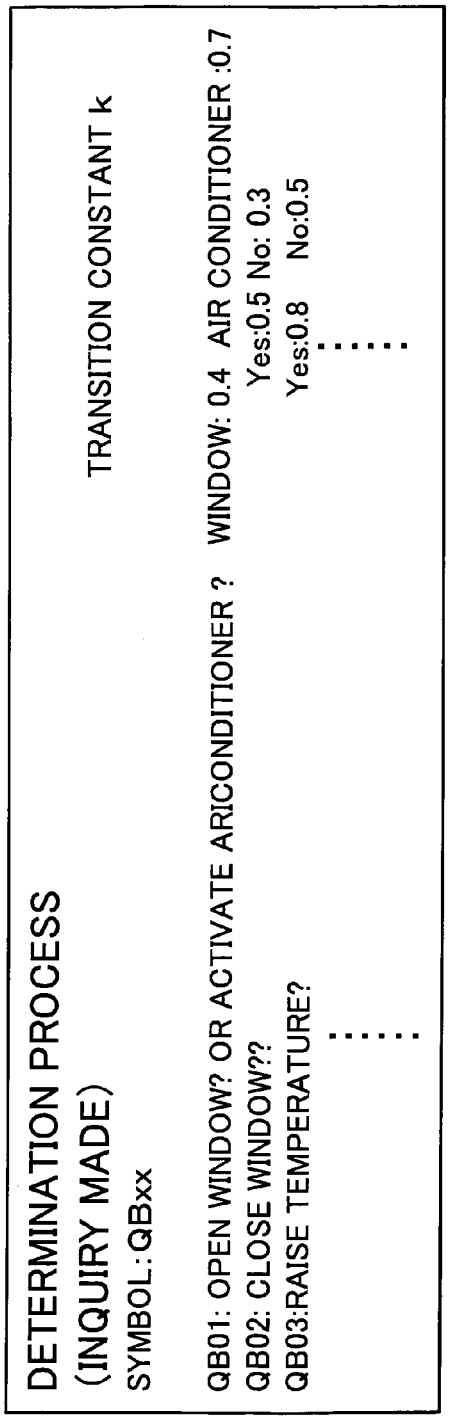
[FIG. 6] A diagram for explaining a discrimination process with an inquiry.
Figure 6B:
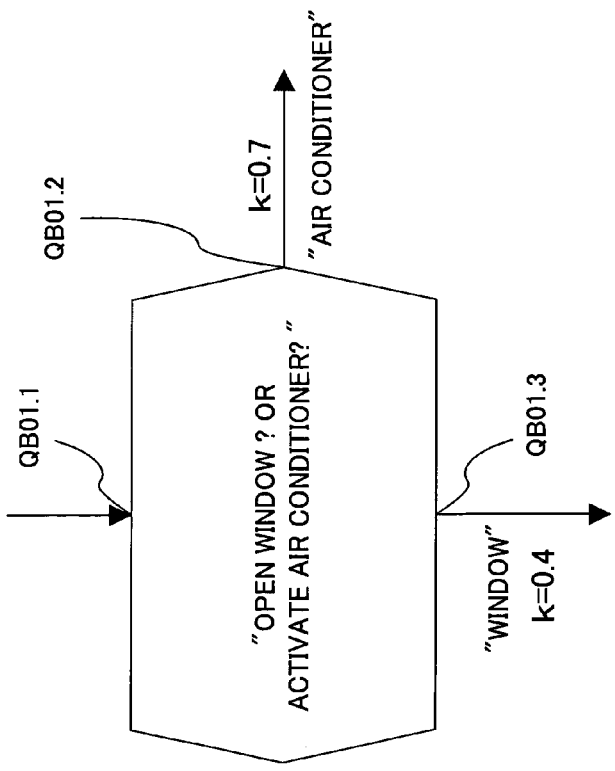

FIG. 6(a) shows an example of a discrimination process QBxx. In this example, a discrimination process QB01, for example, asks a user "Open a window? Activate the air conditioner?", and the transition constant k in the progress direction when the response (the user's answer) is "Activate the air conditioner" is 0.7, and the transition constant k in the progress direction when the response is "open a window" is 0.4. FIG. 6(b) illustrates a flowchart for this example. A node QB01.1 shown in FIG. 6(b) is a start node indicating the start point of the process, a node QB01.2 is a node in the progress direction when it is discriminated that activation of the "air conditioner" is designated in response to the inquiry, and the transition constant k is 0.7. Further, a node QB01.3 is a node in the progress direction when it is discriminated that opening of a window is designated, and the transition constant k is 0.4. A discrimination process QB02 asks the user "Close a window?", the transition constant k in the progress direction when the response (the user's answer) is "Close" is 0.5, and the transition constant k in the progress direction when the response is "Do not close" is 0.3.

Data describing the contents of an "input/output process" stored in the process item database D4 comprises data which designates the contents of data to be input or output. Input data and output data may have arbitrary contents. For example, output data may be data representing reading of a speech which is generated by the speech output unit 4 via the speech synthesis processing unit 3 or a control signal which controls an external device. Input data may be, for example, data to be supplied from an external device.

Figure 7A:
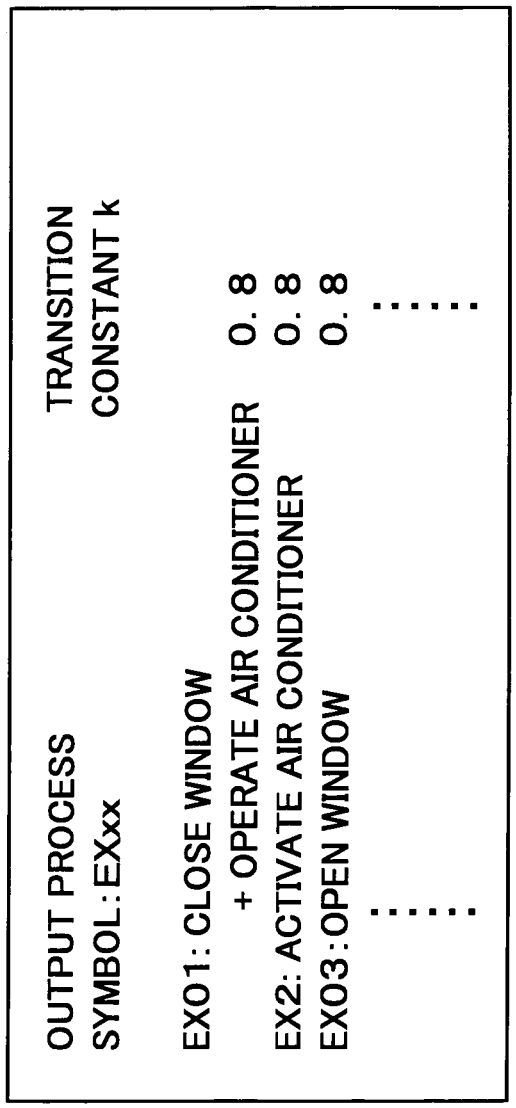
[FIG. 7] A diagram for explaining an input/output process.
Figure 7B:
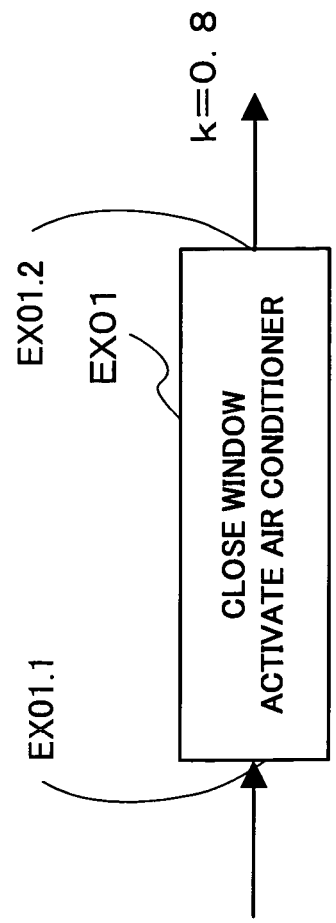

FIG. 7(a) shows an example of an output process EXxx. In this example, an output process EX01, for example, is an operation to "Close a window, and activate the air conditioner", and the transition constant k in the progress direction of executing a process after activation is 0.8. FIG. 7(b) illustrates a flowchart for this example. A node EX01.1 shown in FIG. 7(b) is a start node indicating the start point of the process, a node EX01.2 is a node indicating the end of the process, and the transition constant k is 0.8. With regard to the output process EXxx, the transition constant may not be set, and selection of a node indicating the end of the process may be an essential process.

The wire database D5 comprises a set of data describing transitions among a plurality of processes (TG, CNxx, QBxx, EXxx) (the data will be hereinafter called wires). A wire comprises data described in, for example, a format illustrated in FIG. 8. As illustrated in the figure, a wire Wn (W1, W2 . . . ) is data which designates a preceding process (X), a following process (Y), and a weighting factor J given to transition, for the transition (From (X) To (Y)) from the preceding process X (From (X)) to the following process Y (To(Y)). When the preceding process X is a discrimination process, it is necessary to describe transition from what discrimination result of the discrimination process. A transition causing process X and a transition target Y are specified by the node number of each process.

The weighting factor J of each wire is not a fixed value, but is appropriately calculated and set according to the progress of a process. Calculation of the weighting factor J of the wire will be discussed later with reference to FIG. 10.

The agent processing unit 6 executes a flow generally represented by the process item database D4 and the wire database D5. The process item database D4 and the wire database D5 can describe a flow illustrated in FIG. 9 as a whole based on examples of FIGS. 3 to 8.

Figure 9:
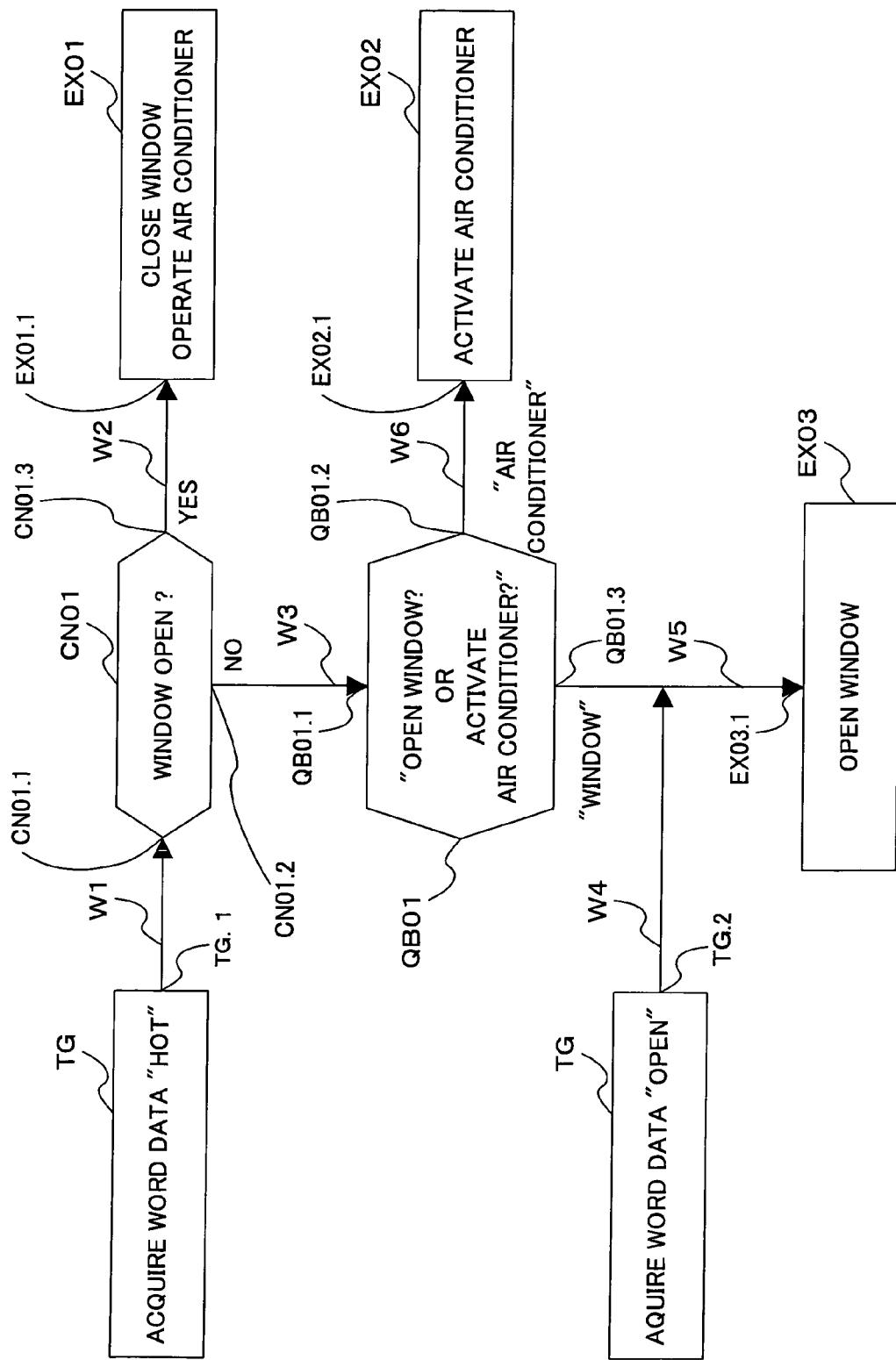
[FIG. 9] A diagram showing a flow represented generally by a process item database and a wire database.

In the flow illustrated in FIG. 9, the agent processing unit 6 stands by for word data representing a word "hot" to be supplied from the language analyzer 2, and acquires the data when supplied, and passes it to a discrimination process CN01 (wire W1) in a trigger process TG01.

In the discrimination process CN01, the agent processing unit 6 acquires information representing whether or not a window is open from a window opening/closing controller 52, and a process proceeds to an input/output process EX01 when having discriminated that it is open (wire W2). In the input/output process EX01, a control signal to instruct closing of the window is output to the window opening/closing controller 52, and a control signal to instruct starting of the cooling operation is output to the air conditioner 51. As a result, the window opening/closing controller 52 closes the window, and the air conditioner 51 starts the cooling operation.

When it is discriminated in the discrimination process CN01 that the window is closed, a process proceeds to a discrimination process QB01 including an inquiry (wire W3). In the discrimination process QB01, first, the agent processing unit 6 supplies the speech synthesis processing unit 3 with data representing a text "Open a window? Or Turn on the air conditioner?". The speech synthesis processing unit 3 reproduces a speech which reads out the text through the speech output unit 4.

In the discrimination process QB01, next, the agent processing unit 6 stands by for data representing a word "window" or words "air conditioner" to be supplied from the language analyzer 2, and when corresponding data is supplied, it is discriminated whether the data represents the word "window" or the words "air conditioner". When it is discriminated that the data represents the word "window", the process proceeds to an input/output process EX03 (wire W5), and when it is discriminated that the data represents the words "air conditioner", the process proceeds to an input/output process EX02 (wire 06).

The agent processing unit 6 outputs a control signal instructing start of cooling to the air conditioner 51 in the input/output process EX02. The agent processing unit 6 outputs a control signal instructing opening of the window for ventilation to the window opening/closing controller 52 in the input/output process EX03.

The agent processing unit 6 stands by for data representing words "open a window" or "open" to be supplied from the language analyzer 2 (trigger process TG02), and shifts the process to the input/output process EX03 when it is supplied (wire W4).

In a case where the language analyzer 2 supplies plural pieces of word data, for example, the agent processing unit 6 executes a plurality of discrimination processes in parallel. In this case, if there are a plurality of processes involving the same word as an input target (for example, data input in a trigger acquisition process or a discrimination process) and word data representing the corresponding word is supplied from the language analyzer 2, the agent processing unit 6 executes all of those processes in parallel.

Next, a method of calculating the weighting factors J of the individual wires will be explained.

In a case where a plurality of process are linked together by wires W, the weighting factor J of a wire W of interest is obtained by sequentially multiplying transition constants k over a transition path originating from a process currently in process to the wire W of interest.

To facilitate understanding, a process whose flow is illustrated in FIG. 10(a) is assumed. In the general process in FIG. 10(a), when a user utters "hot", such is detected and the process starts, and it is first discriminated whether or not a window is open, the user is asked whether to open the window or activate the air conditioner, and a process according to the user's reply is executed when it is closed.

In the process illustrated in FIG. 10(a), for any of processes TG01, CN101, and QB101, the transition constants k for determining individual progress directions are all 0.5 in the forward direction, and are all 0.1 in the reverse (return) direction. In this case, wires are defined as illustrated in, for example, FIG. 10(b).

For example, when a process (or control) is located at the trigger acquisition process TG101 (when a process pointer PP points the trigger acquisition process TG101), the agent processing unit 6 calculates the individual weighting factors J of wires W51 to W55 (all including non-illustrated wires if they are present) by sequentially multiplying transition constants k over a path with the trigger acquisition process TG101 up to a wire of interest as a starting point, writes calculation results in the wire database D5 in association with the wires W51 to W55.

Specifically, when a process is located at the trigger acquisition process TG101, the weighting factor J of the wire W51 becomes the value of a transition constant k allocated to a node linked to the discrimination process CN101 of the trigger acquisition process TG101, i.e., 0.5.

The weighting factor J of the wire W52 in the discrimination process CN101 becomes equal to a result of multiplying a transition constant k=0.5 associated with the wire W51 in the trigger acquisition process TG101 by a transition constant k=0.5 allocated to a node linked to the wire W52 in the discrimination process CN101, i.e., 0.25. Likewise, the weighing factor J of the wire W54 in the discrimination process CN101 becomes equal to, a resultant of multiplying a transition constant k=0.5 allocated to a node linked to the wire W51 in the trigger acquisition process TG101 by a transition constant k=0.5 of a node linked to the wire W54 in the discrimination process CN101, i.e., 0.25.

The weighing factor J of the wire W53 becomes equal to a result of further multiplying a result of multiplication of the transition constant k=0.5 allocated to the node linked to the wire 51 in the trigger acquisition process TG101 by the transition constant k=0.5 allocated to the node linked to the wire W52 in the discrimination process CN101 by a transition constant k=0.5 allocated to a node linked to the wire W53 in the discrimination process QB101, i.e., 0.125. Likewise, the weighing factor J of the wire W55 becomes equal to a result of further multiplying a result multiplication of the transition constant k=0.5 allocated to the node linked to the wire W51 in the trigger acquisition process TG101 by the transition constant k=0.5 allocated to the node linked to the wire W52 in the trigger discrimination process CN101 by a transition constant k=0.5 allocated to a node linked to the wire W55 in the discrimination process QB101, i.e., 0.125.

As the process transitions to the discrimination process CN101, the weighting factor J of the wire W52 becomes a value 0.5 equal to the transition constant k allocated to the node linked to the wire W52, and the weighting factor J of the wire 54 becomes a value 0.5 equal to the transition constant k allocated to the node linked to the wire W52. The weighting factor J of the wire W53 becomes equal to the product of the transition constant k=0.5 allocated to the node linked to the wire W52 and the transition constant k=0.5 allocated to the node linked to the wire W53 in the discrimination process QB101, i.e., 0.25, and the weighing factor J of the wire W55 becomes equal to the product of the transition constant k=0.5 allocated to the node linked to the wire W52 and the transition constant k=0.5 allocated to the node linked to the wire W55 in the discrimination process QB101, i.e., 0.25. Further, the weighting factor J in the reverse direction (direction of returning to the trigger acquisition process TG101) becomes a value 0.1 equal to a transition constant k=0.1 of the reverse-direction node allocated to the node linked to the wire W51.

Further, as the process transitions to the discrimination process QB101, both of the weighting factors J of the wires W53 and W55 become a value 0.5 equal to transition constants k respectively allocated to the nodes linked to the wires W53 and W55. Further, the weighting factor J of the wire W52 becomes a reverse-direction transition constant k=0.1 allocated to a reverse-direction node linked to it. Further, the weighting factor J of the wire WS1 becomes 0.01 that is the product of a reverse-direction transition constant k=0.1 allocated to a node linked to the wire W52 in the discrimination process QB101 and a reverse-direction transition constant k=0.1 allocated to a reverse-direction node linked to the wire W51 in the discrimination process CN101. The weighting factor J of the wire W54 becomes 0.05 that is a product of the reverse-direction transition constant k=0.1 allocated to the node linked to the wire W52 in the discrimination process QB101 and a transition constant k=0.5 allocated to a node linked to the wire W54 in the discrimination process CN101.

Examples of changes in the weighting factors J of the individual wires Wn are illustrated in FIG. 10(c).

Calculations of the weighting factors J are carried out not only for processes of the associated flow, but for all wires of the entire flows, and the calculated weighting factors J are set to the individual wires. A wire which is not associated with a current process may be allocated with a predetermined small coefficient. However, for a wire whose preceding process is a trigger acquisition process, the transition constant k is set high to some extent. This ensures a jump to a conversation whose contents greatly differ from the contents of a conversation that has been made just before.

Figure 11:
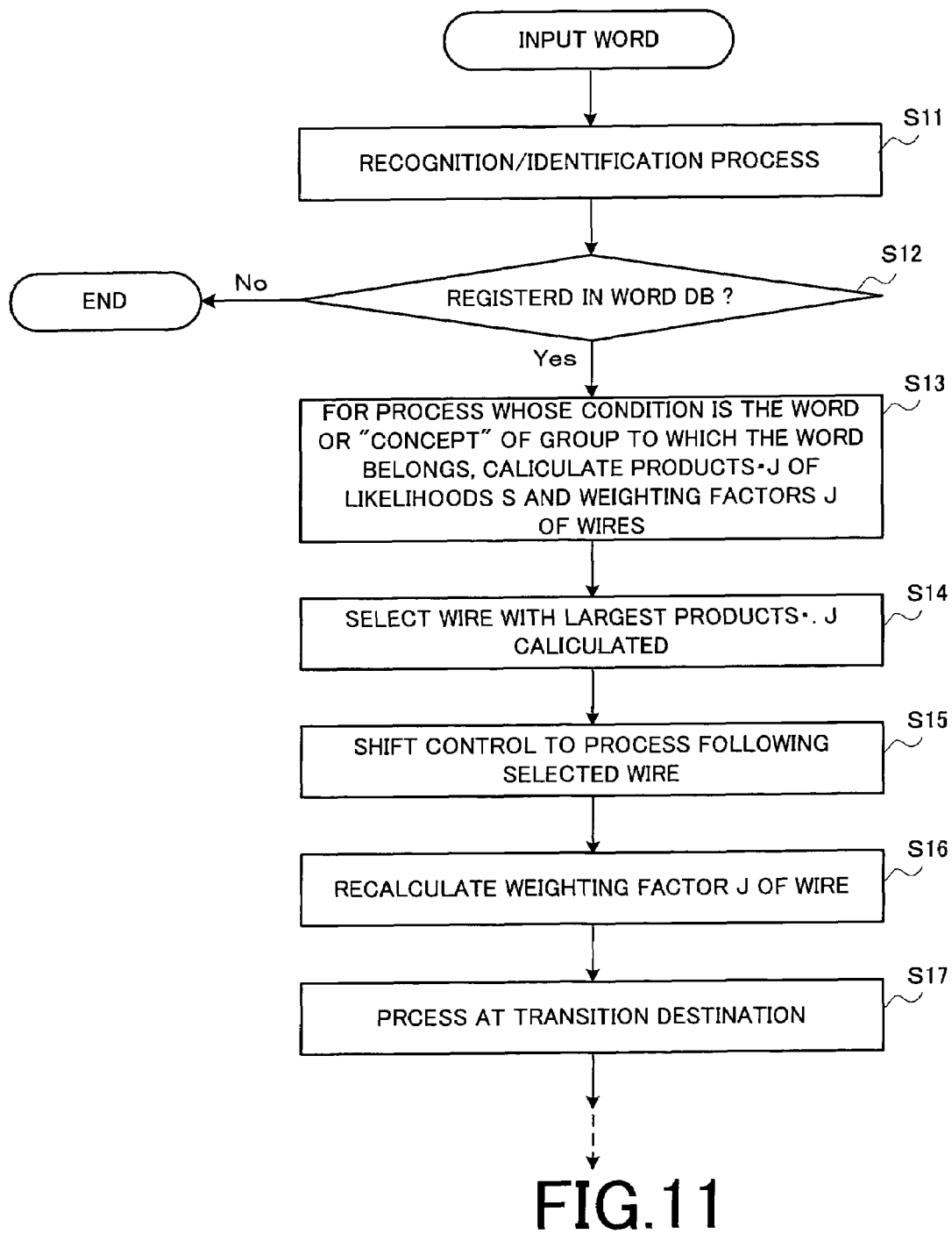
[FIG. 11] A flowchart for explaining the operation of an agent processing unit.

Next, the operation of the entire system structured in this manner will be explained with reference to FIG. 11.

The speech input unit 1 and the language analyzer 2 individually operate, capture a speech, analyze it, and provide the agent processing unit 6 with word data.

When (one or plural pieces of) word data associated with discrimination conditions are supplied from the language analyzer 2, the agent processing unit 6 executes the following processes.

First, the agent processing unit 6 recognizes (identifies) a supplied word (FIG. 11, step S11), and discriminates whether or not it corresponds to a word registered in the word database D4 (step S12). If it is not registered (step S12, No), a word inputting process is terminated.

If it is registered (step S12, Yes), on the other hand, the product of the likelihood of the word and the weighting factor J of the wire is calculated with respect to a process whose condition is the "concept" of the word or the group to which the word belongs (step S13).

For example, suppose that the process pointer PP indicates the trigger acquisition process TG101 in a case where the flow illustrated in FIG. 10(a) is being executed. The weighting factors J of the individual wires in this case are as illustrated in FIG. 10(c–1).

Suppose that in this status, word data indicating a word "hot" with a score of 80% and a word "window" with a score of 50% is input.

In the example illustrated in FIG. 10(a), the word "hot" relates to discrimination in the trigger acquisition process TG101, and the word "window" relates to discrimination in the discrimination process QB101.

As illustrated in FIG. 10(c–1), the weighting factor J of the wire W51 whose preceding process is a process of inputting the word data indicating the word "hot" is 0.5, and the weighting factor J of the wire W53 whose preceding process is a process of inputting the word data indicating the word "window" is 0.125. In this case, the products of the likelihoods S determined for the wires W51 and W53 and the weighting factors J are as indicated by equations 1 and 2.

Product J·S of likelihood S and weighting factor J of wire W51:score of 80% for "hot"×weighting factor J(=0.5) of wire W51=40 (Equation 1)

Product J·S of likelihood S and weighting factor J of wire W53:score of 50% for "window"×weighting factor 0.125 of wire W53=6.25 (Equation 2)

The agent processing unit 6 carries out the above-described processes of determining the products of scores and weighting factors for all the wires the flow has. Subsequently, the agent controlling unit 6 selects wire with the largest calculated product S J (FIG. 11, step S14). The agent controlling unit 6 shifts control to a process following the selected wire (step S15). For example, when the product acquired for the wire W51 represents the largest value, the input data is recognized as representing the word "hot", and transition takes place to the discrimination process CN101 which is the process following the wire W51. Normally, with a process currently in process being taken as a starting point, the weighting factor J is relatively large. Accordingly, the process generally shifts to the next process, but in a case where a word which quite differs from a previous one and has a large likelihood is input, a process corresponding to that word may start.

When the process transitions, the agent processing unit 6 recalculates the weighting factors J of the individual wires based on the status after transition (step S16). Afterward, the process is carried out in accordance with the contents of the process (step S17).

In this example, the discrimination process CN101 is executed. That is, the agent processing unit 6 executes a process like acquisition of information on opening/closing of a window from the window opening/closing controller 52.

For a signal indicating opening/closing of the window from the window opening/closing controller 52, the likelihood of opening may be 100% or 0%, the likelihood of closing may be 0% or 100%. They may be changed in accordance with the level of opening. When there is an input/output process EXxx during the process and the agent processing unit 6 executes this process and outputs speech data, it is generated as a speech. When a process of controlling the air conditioner and window opening/closing controller 52, like the input/output process EX01, is executed during the process, the air conditioner 51 and the window opening/closing controller 52 are controlled in accordance with the contents of the process.

Although the discrimination process based on a "word" has mainly been explained referring to FIG. 8 and FIG. 9, the same is true of the discrimination process based on a concept. A wire from a trigger acquisition process based on a word or a concept is subject to discrimination. A somewhat large weighting factor may be set for transition from a trigger acquisition process. Specifically, a weighting factor 0.8 or the like is given to, for example, the wires in FIG. 8, i.e., transitions from the trigger acquisition process TG02 of acquiring word data representing words "open a window" in the flow in FIG. 9. Then, in a case where the process of the agent processing unit 6 is associated with a trigger acquisition process TG01, for example, as the user pronounces "open a window" and word data whose score for the words "open a window", for example, is 90% is obtained, the product of the score and the weighting factor of the wire W5 associated with "determination on whether or not the user have said "Open a window"" is 90%×0.8, i.e., 72. If the value is a large value which cannot be obtained from the products of scores and weighting factors J calculated for other wires, an input speech is recognized as "open a window", and the probability that the process of the agent processing unit 6 jumps to the discrimination process QB101 becomes higher. If the weighting factors of the other wires are set extremely small, the probability of occurrence of transitions defined by the other wires becomes extremely low, resulting in that the control process is carried out with a recognition rate being improved along the flow of a conversation expected to some extent.

In the embodiment, transition in the reverse direction may occur. However, it is often undesirable to reverse a conversation in practice. Accordingly, a reverse-direction transition constant k should be set to a smaller value than a preceding-direction transition constant k. Then, even if speech data with a high score is obtained from an input speech, a product S·J acquired for a wire written as a weighting factor J based on the reverse-direction transition constant k becomes a small value, so that the possibility of transition in the reverse direction can be suppressed at low. The agent processing unit 6 may treat a process in which the value of the acquired product does not meet a predetermined condition (e.g., a process in which a product value does not reach a predetermined value) in such a way that the process is excluded from transition execution targets.

As illustrated in, for example, FIG. 8, a wire defines transition in the form of from a process item to a process item. As a wire is described in the form as illustrated in FIG. 8 and stored in the wire database D5, it is possible to define relationships among the individual process items as if they were macro processes of a computer. This can facilitate connection of the individual process items.

Because a process item to be a trigger actually becomes discrimination of the score of a word or the like to be recognized associated with a wire to be connected (may be a case of input from another input target device group), a trigger acquisition process item in the wire is not defined as the starting point of the wire, but the wire itself is defined as the origin of transition.

Further, as the connection relationships among the individual process items are defined by wires, wires can be easily added. In a case where the user frequently inputs a speech "find a family restaurant" with an intention to take a rest after a speech "hot" is input, for example, a wire is automatically added with respect to the search process item of a family restaurant. Then, after the wire is automatically added, it becomes possible to appropriately cope with the input "find a family restaurant" by increasing the weighting factor of a wire connected to a family restaurant search process item to some extent (in this case, however, the agent processing unit 6 shall store map data or the like including, for example, information representing the location of a family restaurant, or access external map data or the like).

The automatic addition of a wire may be automatically carried out when the number of jumps from one process item to another is counted and reaches a predetermined number.

As mentioned above, the agent processing unit 6 has a function of updating the contents of the process item database D4 and the wire database D5 to externally supplied new process items and wires. Specifically, for example, as the contents of process item data and/or a wire stored in an external server is updated, the external server notifies the agent processing unit 6 over a network that the process item data and/or wire is updated. In response to the notification, the agent processing unit 6 accesses the server over the network, and downloads new process item data and/or a new wire. Old process item data and/or an old wire stored in the local process item database D4 and wire database D5 is updated to the downloaded new process item data and/or wire.

The agent processing unit 6 may access the external server, and download a database if it has been updated.

Figure 12:
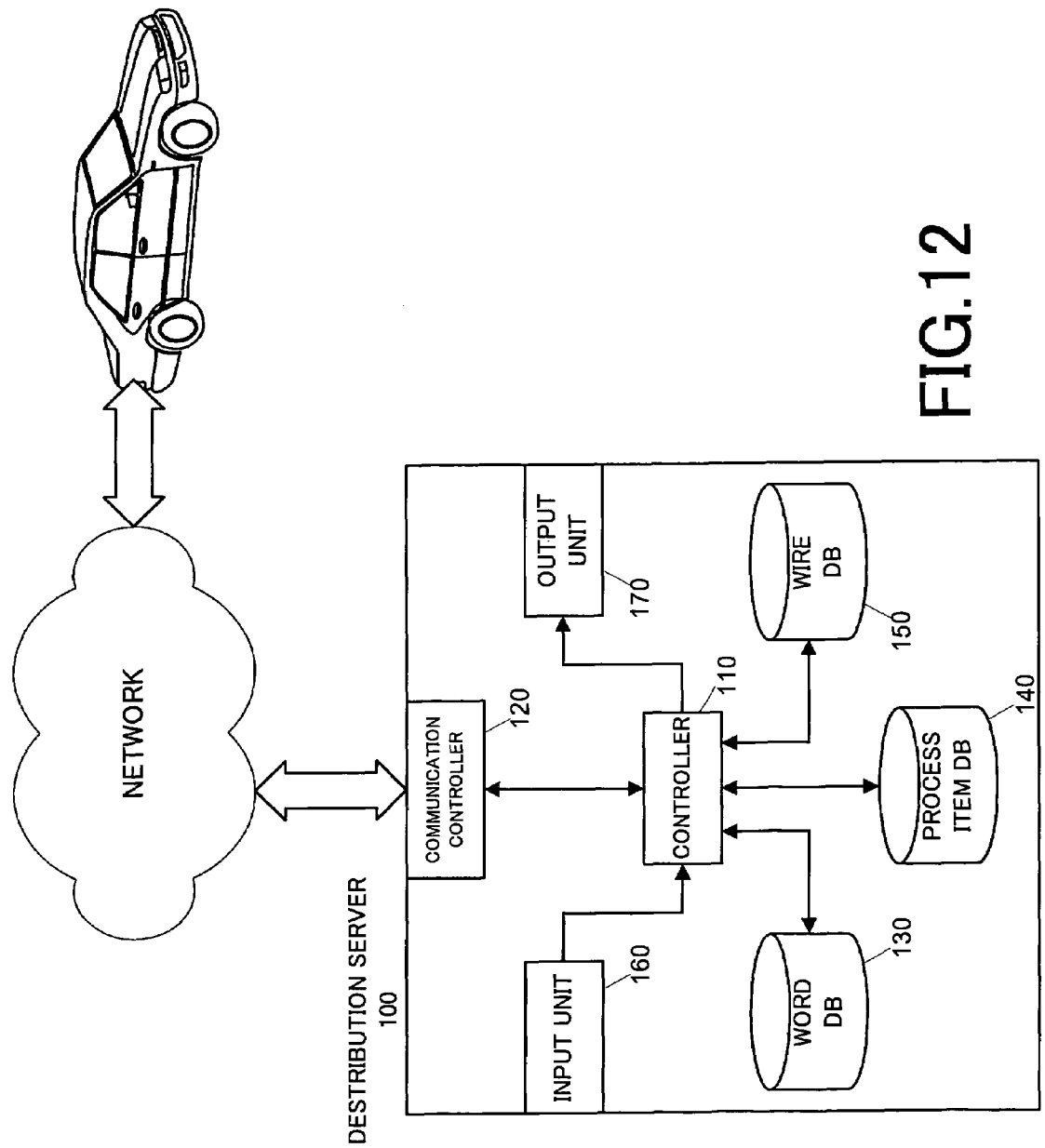
[FIG. 12] A diagram showing the structure of an external server (distribution server) and a network structure.

An example of the structure of an external server will be illustrated in FIG. 12.

This external server 100, which distributes word data, process item data, and/or wire data to the agent processing units 6 of a plurality of vehicles through a communication network, comprises a controller 110, a communication controller 120, a word database 130, a process item database 140, a wire database 150, an input unit 160, and an output unit 170.

The controller 110 comprises, for example, a CPU (Central Processing Unit), controls the individual units of the distribution server 100, and realizes individual processes to be discussed later by running predetermined programs.

The communication controller 120 comprises, for example, a communication apparatus such as a modem or a router, and controls communications between the distribution server 100 and the agent processing unit 6 (communication controller) of the vehicle over the network.

The structure of the network is optional. For example, a private line, a public line network, a cable television (CATV) network, a wireless communication network, a wire broadcasting network or the like can be employed.

The word database 130 comprises, for example, a rewritable storage device like a hard disk drive, and stores word data distributed by the distribution server 100 together with version information (for example, time stamp).

The process item database 140 comprises, for example, a rewritable storage device like a hard disk drive, and stores process item data to be distributed, together with version information (for example, time stamp).

The wire database 150 comprises, for example, a rewritable storage device like a hard disk drive, and stores wire data to be distributed, together with version information (for example, time stamp).

The manager of the distribution server 100 properly manipulates the input unit 160, and updates information in the individual DBs 130 to 150.

Figure 13:
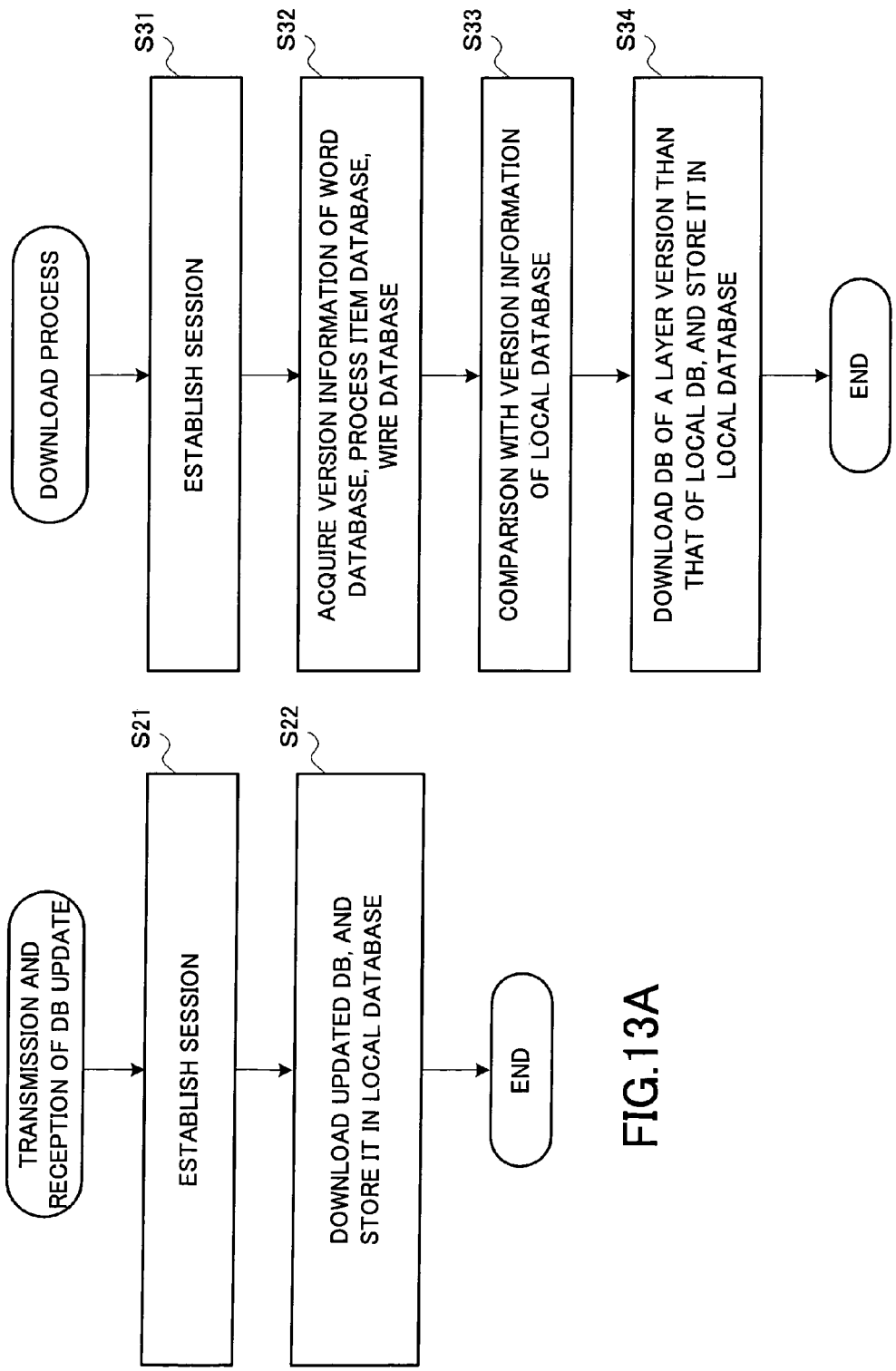
[FIG. 13] A flowchart for explaining a download process.

Upon reception of an update notification from the distribution server 100 through the communication controller (CCU) 64, the agent processing unit 6 of each vehicle starts, for example, a process in FIG. 13(*a*) and establishes a session (step S21), downloads updated data, and updates local databases (step S22). Or, the agent processing unit 6 of each vehicle regularly or properly accesses the distribution server 100 through the communication controller (CCU) 64 and establishes a session (step S31), and acquires the version information (update date or the like) of each database (step S32). It compares the versions of both data with each other (step S33), downloads data newer than data locally stored, and sets the data in the database (step S34).

Employment of such a structure ensures appropriate update of data of all vehicle control systems which can use the distribution server 100 by merely updating information recorded in the distribution server 100.

It is desirable that the distribution server 100 should store data compressed and encrypted, and the agent processing unit 6 should download the data, expand and decrypt the data, and set the data in the database. This suppresses communication traffic, and prevents information leakage.

A timing at which the agent processing unit 6 downloads data from the distribution server 100 is not limited to the aforementioned example, and is optional, and, for example, in a case where process item and/or a wire corresponding to the user's request is not stored, it may detect that, access the distribution server 100 over the network, and download new process item data and/or a new wire. Further, in a case where an input/output target device group 5 to be connected to the agent processing unit 6 is newly added or a new function is added, the agent processing unit 6 may automatically detect that, access the distribution server 100 over the network, and download the new process item data and/or wire in such a manner as described above.

(Application Example to Actual Control)

The foregoing explanation of the invention has been given of a case, as an example, where the air conditioner 51 and the window opening/closing controller 52 are controlled, but control targets are arbitrary, and scenes of controlling are also arbitrary. Another example where an air conditioner, an audio device, and a window opening/closing controller are controlled will be explained below.

Figure 14:
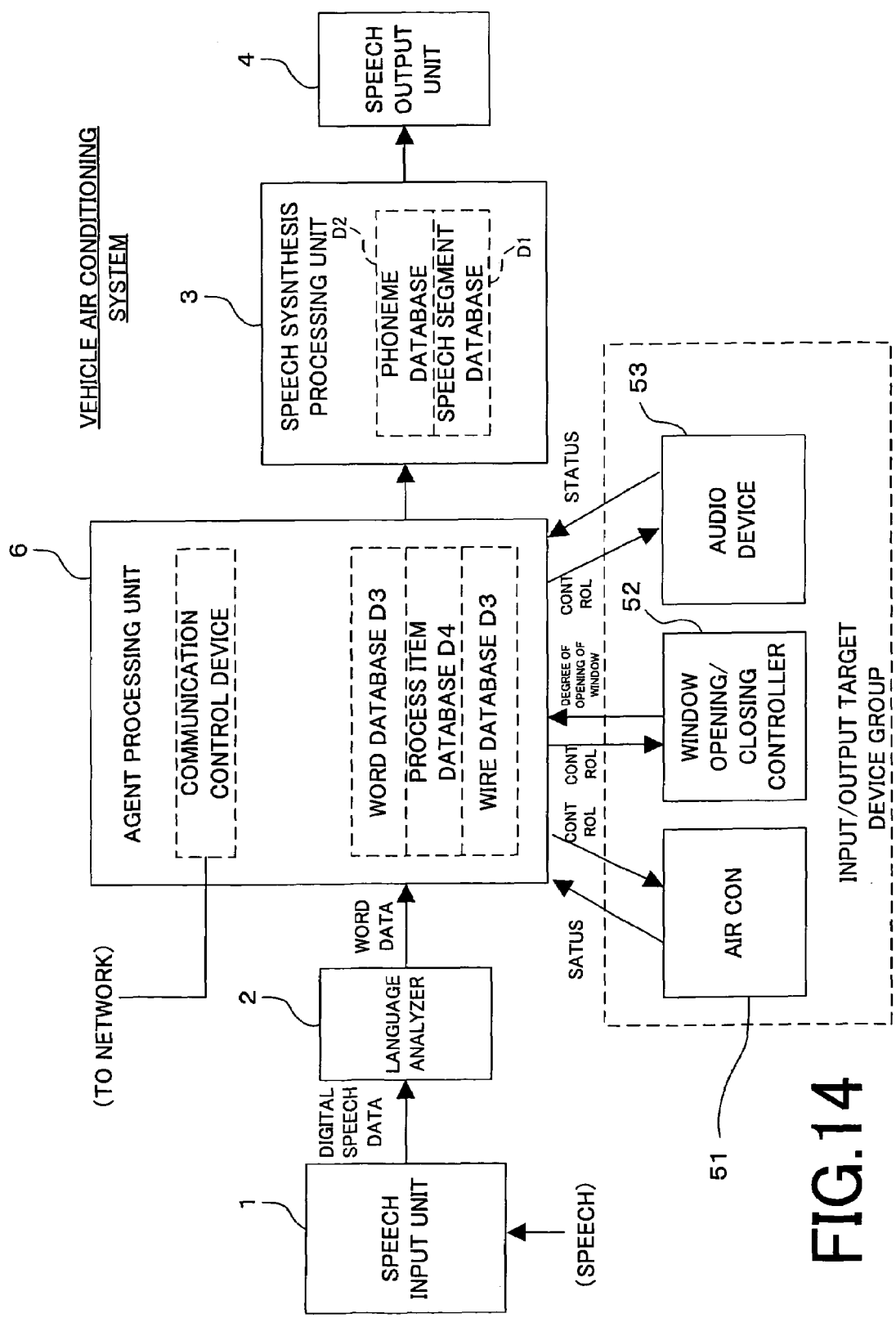
[FIG. 14] A structural diagram for explaining a modified example.

As shown in FIG. 14, the control target devices 5 include an audio device 53 in this example. The audio device 53 operates in accordance with an instruction from the agent processing unit 6, and supplies a status signal indicating the operation status thereof to the agent processing unit 6.

In the example, words which mean a concept "rise" and a concept "lower", respectively are grouped in the word database D3. For example, words "raise", "rise", "enhance", "up" and the like are grouped under the concept "rise", words "lower", "fall", "reduce", "down", and the like are grouped under the concept "lower".

First, an operation whose control targets are the audio device 53 and the window opening/closing controller 52 will be explained (control of the air conditioner 51 will not be mentioned).

Figure 15:
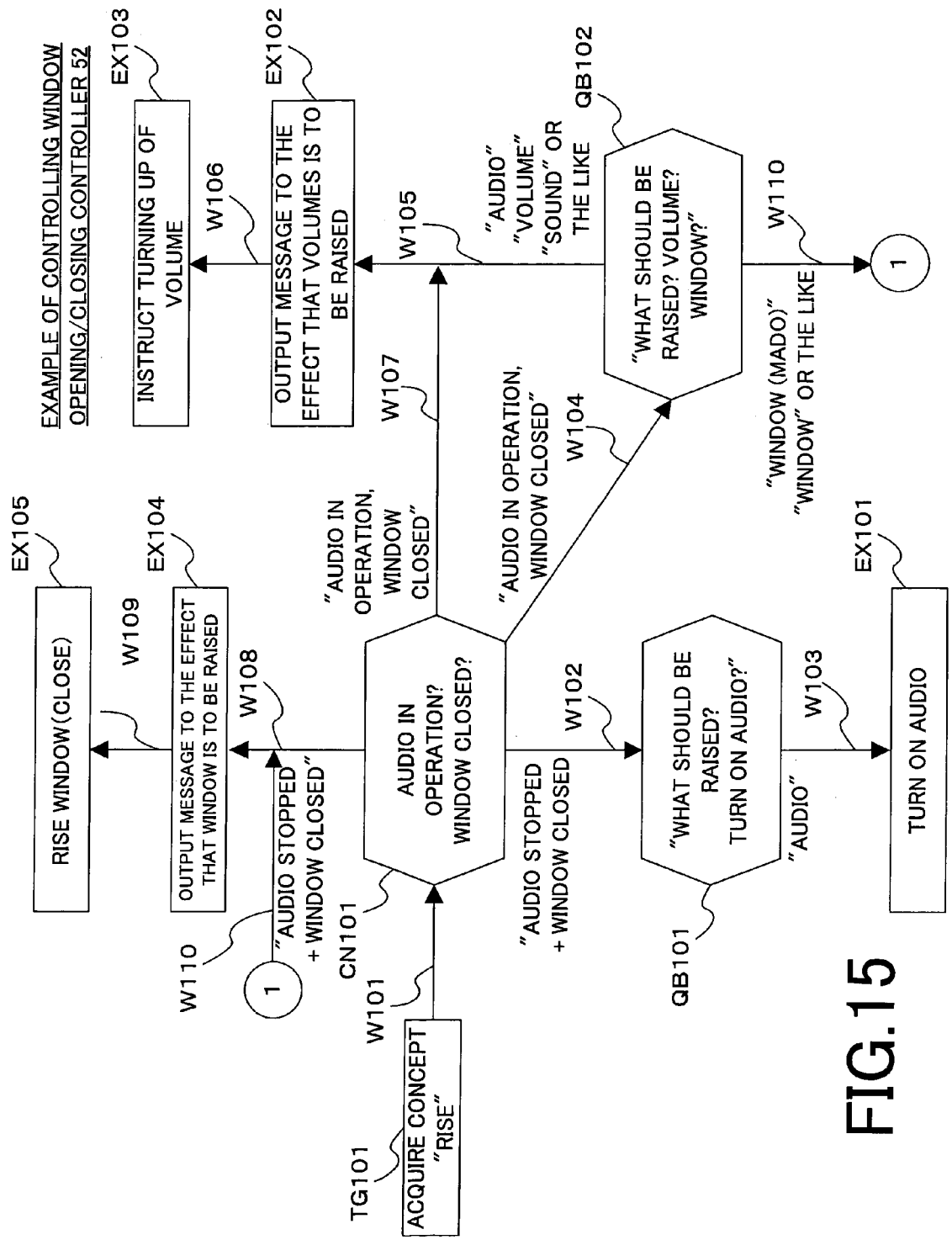
[FIG. 15] A flowchart showing operation examples of a system shown in FIG. 14.

Note that a process represented by flows in FIG. 15 is defined by process item data stored in the process item database D4 and a wire stored in the wire database D5 in this example.

As the user utters a speech which means rise like "raise", the speech input unit 1 and the language analyzer 2 perform a speech recognition process, and supply the agent processing unit 6 with a candidate "raise" and the score thereof, and other candidates and their scores.

As mentioned above, with a position indicated by the process pointer PP at a given time being a reference position, a weighting factor J which becomes smaller as it moves away from the reference position is set for each wire W.

As explained with reference to FIG. 11, the agent processing unit 6 discriminates whether or not every candidate matches with all target acquisition processes TG and discriminations of discrimination processes CN or QB. For a wire W corresponding to a matched candidate of a process discriminated as matching, the agent processing unit 6 multiplies the weighting J of each wire at a given time by the score S of each word, and determines a multiplication value S·J for each wire. Acquired products S·J are compared with one another, and a process which is led by a wire W having the largest multiplication value S·J is executed.

In the example of FIG. 15, the agent control unit 6 discriminates in a target acquisition process TG101 that the input word "raise" matches with the concept "rise". A product J·S of the weighting J and the score of the word "raise" is determined for a wire W101. (It is assumed that) the product for the wire W101 becomes a value larger than products for other wires. Then, the process progresses to a discrimination process CN101 through the wire W101.

The agent processing unit 6 acquires status information from the audio device 53 and information indicating the opening/closing state of the window from the window opening/closing controller 52 in the discrimination process CN101.

When the agent processing unit 6 discriminates in the discrimination process CN101 that "the audio device 53 is not in operation and the window is closed", the process traces a wire W102, proceeds to a discrimination process QB101 with an inquiry, and a message prompting specification of a target of operation and the contents thereof like "What should be raised? Turn on power of audio?" is output to the speech synthesis processing unit 3. The speech synthesis processing unit 3 and the speech output unit 4 generate a speech corresponding to the message, and output it.

As the user utters, for example, "audio" or "turn on" in response to the message, the word is recognized, the control progresses to an input/output process EX101 through a wire W103, and the agent processing unit 6 controls the audio 53 and turns on the power thereof.

When it is discriminated in the discrimination process CN101 that the audio device 53 is in operation and the window is opened (with a glass lowered below a home position), the process traces a wire W104, proceeds to a discrimination process QB102, and a message which prompts specification of an operation target like "What should be raised?Volume? or Window?" is output.

As the user utters, for example, "audio", "volume", and "sound" in response to the message, those words are recognized, and the control progresses to an input/output process EX102 through a wire W105. A message to the effect that a volume is to be turned up (increased) is output in the input/output process EX102. The control leads to an input/output process EX103 through a wire W106, and the audio device 53 is instructed to increase the volume by a predetermined amount. As the user utters, for example, "window", or "window" in response to the message, those words are recognized, and the control progresses to an input/output process EX104 through a wire W110.

In contrast, when it is discriminated in the discrimination process CN101 that the audio device 53 is in operation and the window is closed, only the audio device 53 is a controllable device which corresponds to the concept "rise". Accordingly, the control progresses to the input/output process EX102 through a wire W107, a message like "volume is to be turned up" is output, and the volume of the audio device 53 is turned up by the predetermined amount in the input/output process EX103.

When it is discriminated in the discrimination process CN101 that the audio device 53 is at a rest and the window is opened, only the window opening/closing controller 52 is a controllable device which corresponds to the concept "rise". Accordingly, the control traces a wire W108, has a message like "window is to be closed" output in the input/output process EX104, traces a wire W109, and raise and close the window in an input/output process EX105.

Next, a process of controlling the air conditioner 51 and the window opening/closing controller 52 will be explained.

Figure 16:
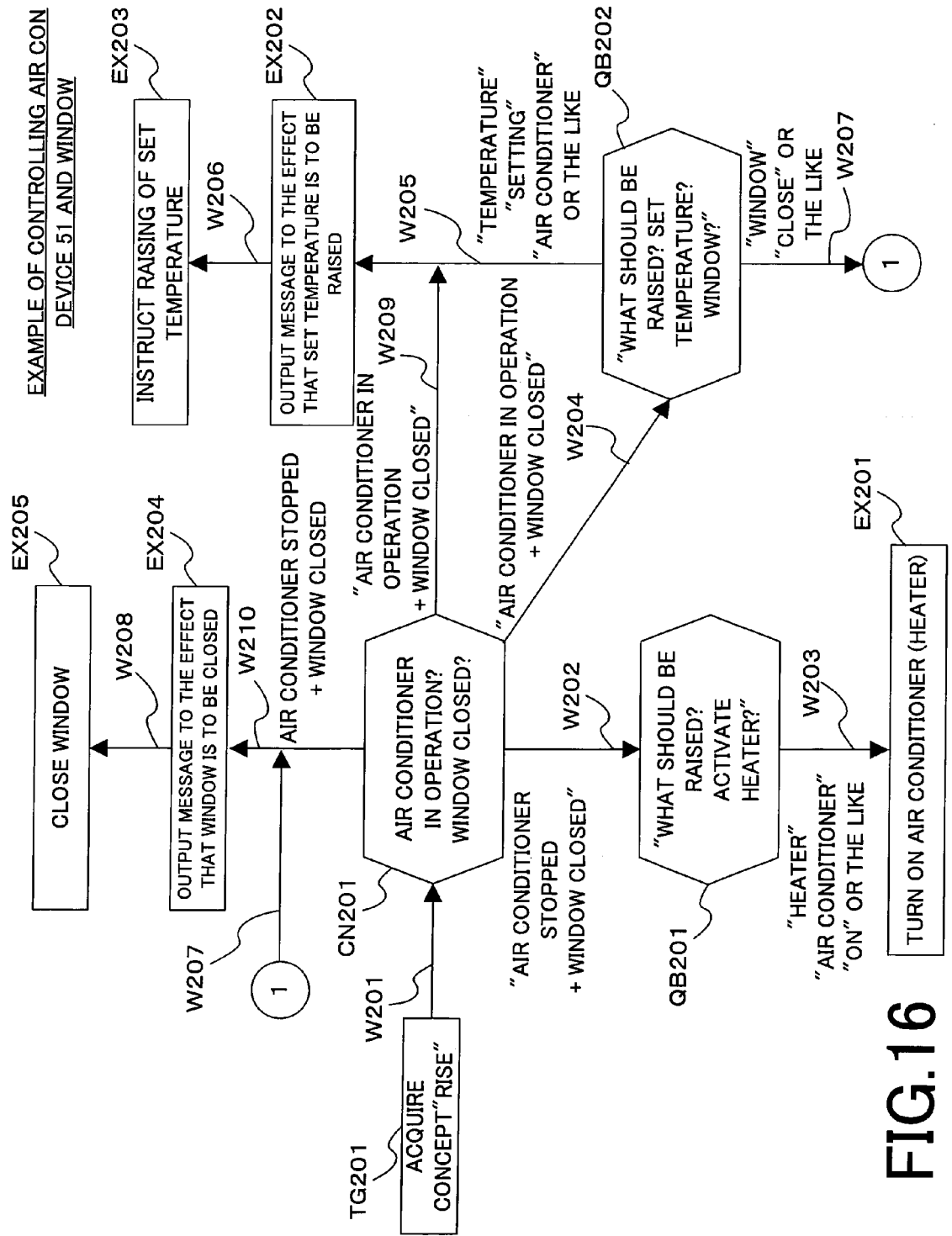
[FIG. 16] A flowchart showing operation examples of a system shown in HG 14.

Note that a process represented by flows in FIG. 16 is defined by process item data stored in the process item database D4 and wires stored in the wire database D5 in this example.

As the user utters a speech meaning rise like "raise", a target acquisition process TG201 discriminates that an input word "raise" matches with the concept "rise". (It is supposed that) a product S·J of the likelihood (score) S of a recognition result and a weighting factor J for a wire W201 becomes a value larger than products for other wires.

The process proceeds to a discrimination process CN201 through a wire W201. The agent processing unit 6 acquires status information from the air conditioner 51 and information indicating the open/close state of the window from the window opening/closing controller 52 in the discrimination process CN201.

When the agent processing unit 6 discriminates in the discrimination process CN201 that "the air conditioner 51 is not in operation and the window is closed", shifts the process to a discrimination process QB201 with an inquiry through a wire W202, and outputs a message which prompts specification of an operation target and the contents thereof like "What should be raised? Activate heater?" to the speech synthesis processing unit 3. The speech synthesis processing unit 3 and the speech output unit 4 creates a speech corresponding to the message, and output it.

In response to the message, as the user utters, for example, "heater", "air conditioner", "temperature", or "turn on", a word is recognized, the control progresses to an input/output process EX201 through a wire W203, and the agent processing unit 6 controls the air conditioner 51 and turns on the power thereof.

When it is discriminated in the discrimination process CN201 that "the air conditioner 51 is in operation and the window is opened (lowered below the home position)", the process traces a wire W204, and a message which prompts specification of an operation target like "What should be raised? Set temperature of air conditioner? Or window?" is output. In response to the message, as the user utters, for example, "air conditioner", "temperature", or "setting", those words are recognized, and the control progresses to an input/output process EX202 through a wire W205. A message to the effect that the set temperature of the air conditioner is to be raised is output in the input/output process EX202. Subsequently, the control leads to an input/output process EX203 through a wire W206, and the air conditioner device 51 is instructed to rise the set temperature.

As the user utters, for example, "window", "close" and the like in response to the message output in the process QB202, those words are recognized, and the control progresses to an input/output process EX204 through a wire W207. A message to the effect that the window is to be closed is output in the input/output process EX204. The control leads to the input/output process EX204 through a wire W208, and the window opening/closing controller 52 is instructed to raise the window (raise the window glass).

When it is discriminated in the discrimination process CN201 that "the air conditioner device 51 is in operation and the window is closed", only the air conditioner device 51 is a controllable device which corresponds to the concept "rise". Accordingly, the control progresses to the input/output process EX203 through a wire W209, a message to the effect that "set temperature of air conditioner is to be raised" is output, and the set temperature is raised by a predetermined degree in the input/output process EX203.

When it is discriminated that "the air conditioner device 51 is at a rest and the window is opened", only the window opening/closing controller 52 is a controllable device which corresponds to the concept "rise". Accordingly, the control traces a wire W210, has a message like "window is to be closed" output in the input/output process EX204, traces a wire W208 and has the window closed (the window glass raised) in the input/output process EX205.

Next, an operation of controlling the air conditioner 51 and the audio device 53 will be explained.

Figure 17:
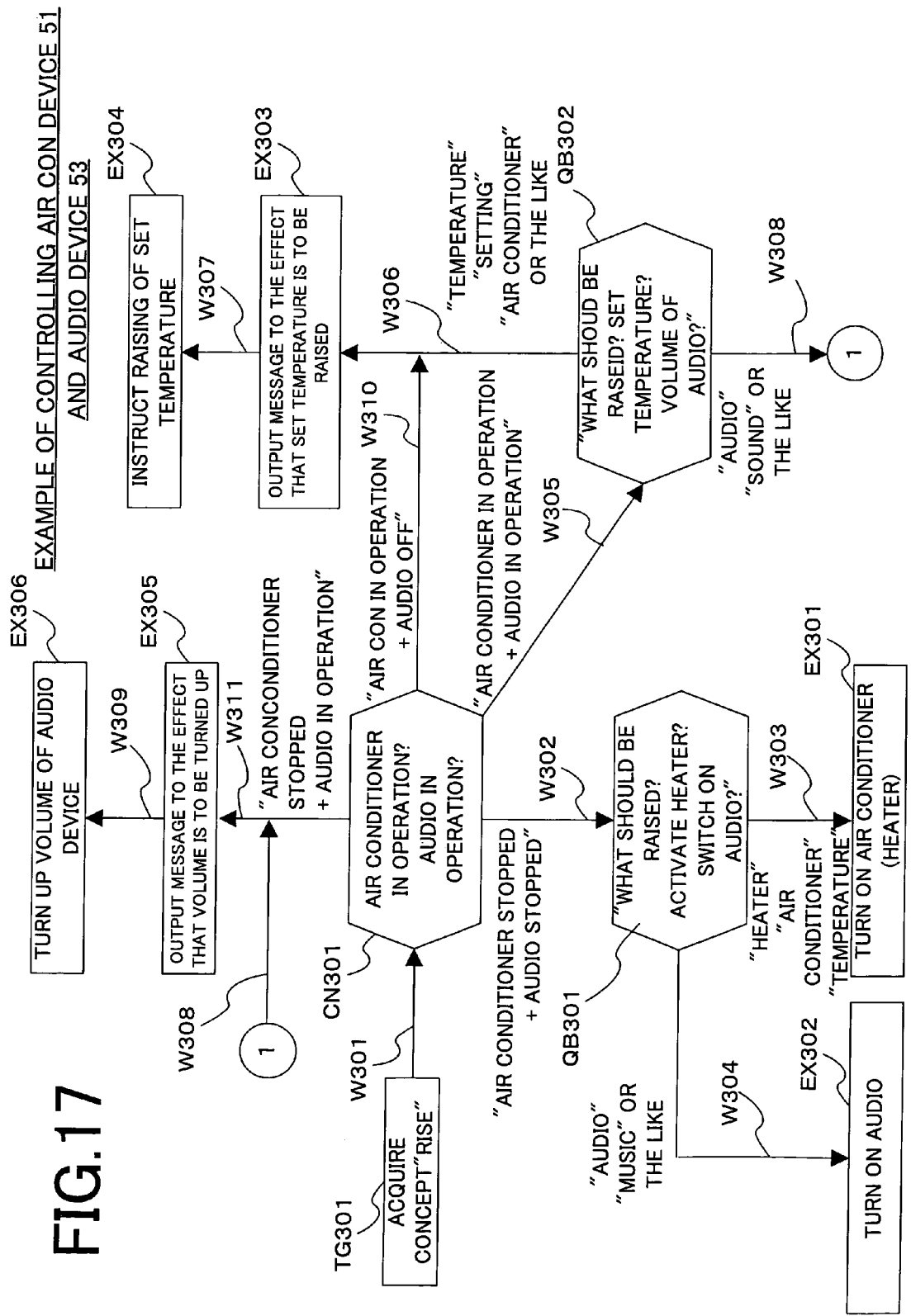
[FIG. 17] A flowchart showing operation examples of a system shown in FIG. 14

Note that a process represented by flows in FIG. 17 is defined by process item data stored in the process item database D4 and wires stored in the wire database D5 in the example.

As the user utters a speech meaning rise like "raise", a target acquisition process TG301 discriminates that an input word "raise" matches with the concept "rise". (It is supposed that) a product of a score S and a weighting factor J for a wire W301 becomes a value larger than products for other wires.

Then, the process proceeds to a discrimination process CN301 through a wire W301. The agent processing unit 6 acquires information respectively indicating operation statuses of the air conditioner 51 and the audio device 53 in the discrimination process CN301. When the agent processing unit 6 discriminates in the discrimination process CN301 that "the air conditioner 51 is not in operation and audio device 53 is not in operation", the process progresses to a discrimination process QB301 with an inquiry through a wire W302, and a message which prompts specification of a target of operation and the contents thereof like "What should be raised? Activate heater? Switch on audio?" is output to the speech synthesis processing unit 3. The speech synthesis processing unit 3 and the speech output unit 4 create a speech corresponding to the message, and output it.

In response to the message, as the user utters, for example, "heater", "air conditioner", "temperature" or the like, the word is recognized, the control progresses to an input/output process EX301 through a wire W303, and the agent processing unit 6 controls the air conditioner device 51 and turns on the power thereof. In response to the message, as the user utters, for example, "audio", "music" or the like, the word is recognized, the control progresses to an input/output process EX302 through a wire W304, and the agent processing unit 6 controls the audio device 53 and turn on the power thereof.

When it is discriminated in the discrimination process CN301 that "the air conditioner 51 and the audio device 53 are both in operation", the process traces a wire W305, and a message which prompts specification of an operation target like "What should be raised? Set temperature of air conditioner? Volume of audio" is output. In response to the message, as the user utters, for example, "air conditioner", "temperature", and "setting", those words are recognized, and the control progresses to an input/output process EX303 through a wire W306. A message to the effect that the set temperature of the air conditioner 51 is to be raised is output in the input/output process EX303. The control leads to an input/output process EX304 through a wire W307, and the air conditioner device 51 is instructed to rise the set temperature. In contrast, as the user utters, for example, "audio" and "sound" in response to the message output in the process QB302, those words are recognized, and the control proceeds to an input/output process EX305 through a wire W308. A message to the effect that the volume of the audio is to be increased is output in the input/output process EX305. The control leads to an input/output process EX306 through a wire W309, and the audio device 53 is instructed to rise a sound volume (turn up a sound).

When it is discriminated in the discrimination process CN301 that "the air conditioner device 51 is in operation and the audio device 53 is in off state", only the air conditioner device 51 is a controllable device which corresponds to the concept "rise". Accordingly, the control progresses to the input/output process EX303 through a wire W310, a message to the effect that "set temperature of air conditioner is to be raised" is output, and the set temperature of the air conditioner device 51 is raised by a predetermined degree in the input/output process EX304.

When it is discriminated in the discrimination process CN301 that "the air conditioner device 51 is at a rest and the audio device 53 is in operation", only the audio device 53 is a controllable device which corresponds to the concept "rise". Accordingly, the control traces a wire 311, has a message like "volume is to be turned up" output in the input/output process EX305, traces a wire W309, and the volume of the audio device 53 is turned up in the input/output process EX306.

Next, a control whose control targets are all of the air conditioner 51, the window opening/closing unit 52, and the audio device 53 will be explained.

Figure 18:
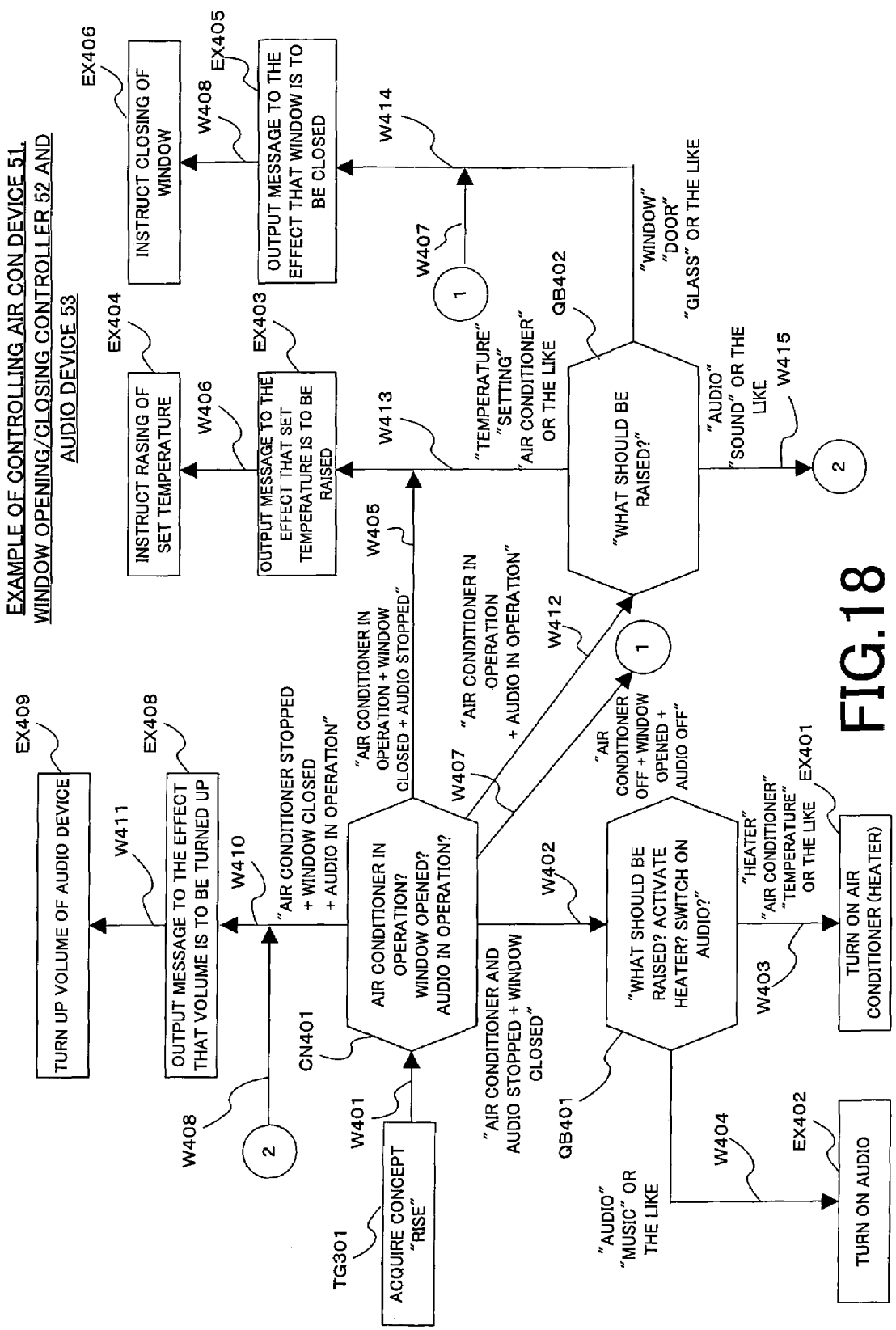
[FIG. 18] A flowchart showing operation examples of a system shown in FIG. 14

Note that a process represented by flows in FIG. 18 is defined by process item data stored in the process item database D4 and wires stored in the wire database D5 in this example.

As the user utters a speech meaning rise like "raise", a target acquisition process TG401 discriminates that the input word "raise" matches with the concept "rise". (It is supposed that) a product of a score S and a weighting factor J for a wire W401 becomes a value larger than products for other wires.

Then, the process proceeds to a discrimination process CN401 through a wire W401. The agent processing unit 6 acquires information individually indicating the operation statuses of the devices 51 to 53 in the discrimination process CN401. When the agent processing unit 6 discriminates in the discrimination process CN401 that "the air conditioner 51 is not in operation, the window is closed, and the audio device 53 is not in operation", the process progresses to a discrimination process QB401 with an inquiry through a wire W402, a message which prompts specification of a target of operation and the contents thereof like "What should be raised? Activate heater? Switch on audio?" is output to the speech synthesis processing unit 3. The speech synthesis processing unit 3 and the speech output unit 4 creates a speech corresponding to the message, and output it.

As the user utters, for example, "heater", "air conditioner", or "temperature" in response to the message, the word is recognized, the control progresses to an input/output process EX401 through a wire W403, and the agent processing unit 6 controls the air conditioner device 51 and turns on the power thereof. As the user utters, for example, "audio", or "music" in response to the message, the word is recognized, the control progresses to an input/output process EX402 through a wire W404, and the agent processing unit 6 controls the audio device 53 and turns on the power thereof.

When it is discriminated in the discrimination process CN401 that "the air conditioner device 51 is in operation, the window is closed and the audio device 53 is off", only the air conditioner device 51 is a controllable device which corresponds to the concept "rise". Accordingly, the control progresses to an input/output process EX403 through a wire 405, outputs a message to the effect that "set temperature of air conditioner is to be raised", traces a wire W406, and the set temperature is raised by a predetermined degree in the input/output process EX404.

When it is discriminated in the discrimination process CN401 that "the window is in an open state, and the air conditioner device 51 and the audio device 53 are both in off states", only the window opening/closing controller 52 is a controllable device which corresponds to the concept "rise". Accordingly, the control progresses to an input/output process EX405 through a wire W407, outputs a message to the effect that "window is to be closed", traces the wire W408, and the window is closed (the window glass is raised up to the home position) in an input/output process EX406.

When it is discriminated in the discrimination process CN401 that "the audio device 53 is in operation, the air conditioner device 51 is at a rest and the window is closed", only the audio device 53 is a controllable device which corresponds to the concept "rise". Accordingly, the control traces a wire 410, outputs a message like "volume is turned up" in an input/output process EX408, traces a wire W411, and the volume of the audio device 53 is turned up in the input/output process EX408.

When it is discriminated in the discrimination process CN401 that the operation status is other than aforementioned cases, the process traces a wire W412, and a message which prompts specification of an operation target like "What should be raised? Set temperature of air conditioner? Close window? Volume of audio?" is output. As the user utters, for example, "air conditioner", "temperature", or "setting", "window", "close", "glass", "audio", and "sound" in response to the message, those words are recognized, and in response to the contents thereof, the control appropriately progresses to the foregoing input/output processes EX403, EX405, or EX408 through wires W413 to 415.

According to the aforementioned structure, to obtain a result orally instructed by the user, a variable which should be changed (the set temperature of the air conditioner, the position of the window glass, or the volume of the audio device 53), a direction in which the variable (rise) is to be changed, and a device which should be controlled to change the variable can be specified, and in a case where a specified device is controlled in such a manner as to change a specified variable in a specified direction, when the number of devices which are controllable in such a manner as to change the specified variable in the specified direction is one, one device can be controlled, and when there are plurality of devices which are controllable in such a manner as to change the specified variable in the specified direction, which one of the controllable devices is desired to be operated can be specified based on a candidate specified by further acquisition of speech data by the speech recognition means, and a specified device can be controlled. As an operation target is once again specified by a speech after the message which prompts specification of an operation target is output, the target variable of a specified operation target is raised by a predetermined amount.

The agent processing unit 6 can cope with an instruction whose contents is different from an instruction planned by a process instructed by the pointer PP in any of the foregoing processes. That is, as explained above, because the weighting factor of a wire corresponding to a trigger acquisition process is set at a predetermined value larger than the weighting factors of other wires, it is possible to cope with another non-related speech instruction, e.g., "What time is it now?" even if the foregoing process corresponding to "raise" is in execution.

Likewise the forgoing "raise", a control can be performed for "lower". For grouping under those concepts "rise" and "lower", the grouping flags shown in FIG. 3 are used. That is, when there are a plurality of devices which have a concept corresponding to word data obtained by the language analyzer 2, all of them are extracted as control target devices, and it is once again prompted to specify which device is controlled in those control target devices. At this time, an extracted device is not randomly set as a control target device, but it is possible to perform highly-accurate response by detecting individual operation statuses. The explanation has been given of a case where two or three control target devices are in presence like the audio device and the window, and the air conditioner and the window, but it is possible to perform processes for greater than or equal to four control-target devices.

In the aforementioned device control device, to a speech or the like to be input, a relationship between a wire explained by the flowchart shown in FIG. 5 and a process item, a condition set for a wire, and a transition constant k are appropriately applied. Specifically, as the user performs speech input as "raise" to the speech input unit 1 for example, the language analyzer 2 refers to the word database, and calculates a score corresponding to each word. The calculated score is output to the agent processing unit 6 as word data, and is set to a wire to which a corresponding word is set. A wire supplied with the score multiplies respectively corresponding weighting factor and score, and obtains a final discrimination result. A word indicating the highest value among the obtained discrimination results is recognized as an input speech. That is, when a word indicating the highest value among the obtained discrimination results is "raise", an input speech is recognized as "raise". A corresponding wire is selected, and a status transitions to a process instructed by the wire. A process hereinafter progresses in the similar way. If a plurality of similar words having different meanings are set for a wire, it is possible to cope with a word uttered by the user with a feeling at a given time. For example, words, such as "raise", and "up" are set as conditions for a wire. Then, a wire is appropriately selected even if an instruction is given by any speeches, and a control is performed by a natural conversation.

If data and a wire representing the contents of a process are described appropriately, the above-described vehicular air conditioning system need not completely specify a device to be controlled and the contents of control to be added, but can respond to a language spoken by the user, assume the request of the user from the language, appropriately determine what control should be applied to which device, and apply control according to the result of the discrimination to a device.

The agent processing unit 6 has a function of automatically creating a new wire, and may download a new process item together with a program describing what relationship a wire to be set has with respect to the downloaded new process item and an existing process item.

If data and a wire representing the contents of a process are described appropriately, the above-described vehicular air conditioning system need not completely specify a device to be controlled and the contents of control to be added, but can respond to a language spoken by the user, assume the request of the user from the language, appropriately determine what control should be applied to which device, and apply control according to the result of the discrimination to a device.

Because process item data and a wire are updated to new ones at any time, there is always room for changing how the agent processing unit 6 responds, so that the user is not likely to get bored with interaction with the vehicular air conditioning system.

The structure of the vehicular air conditioning system is not limited to the above-described one.

For example, devices belonging to the input/output target device group 5 should not necessarily be devices which bring about a result directly satisfying the user's demand, and may comprise, for example, a device (for example, a display apparatus like a liquid crystal display) that controls an external display apparatus or the like which outputs a message for prompting the user to take a specific action.

The word database may store not only data representing a word, but also data representing a phrase of plural words, as an element of the word database, or may store data representing a part of a word or a phoneme, as an element of the word database. A word or the like should not necessarily be grouped under a specific concept, and even in a case where grouping is done, data to be used for carrying out grouping may not take the form of a set of flags.

The agent processing unit 6 may spontaneously download new process item data and a new wire without waiting for notification from an external supplier, or may start downloading new process item data and a new wire in response to word data supplied from the language analyzer 2.

The agent processing unit 6 may change a weighting factor described for a wire in accordance with a predetermined rule based on the number of times a transition represented by the wire has been executed, and rewrite the wire so that the transition constant k becomes the value after the change. Specifically, for example, the wire database stores the number of executions of a transition represented by each wire, with respect to that wire. The agent processing unit 6 rewrites the value of the number every time the transition is newly executed, thereby incrementing the value of the number by 1, and rewrites the transition constant k described for each wire to a value which is proportional to, for example, the number stored for the wire.

The agent processing unit 6 may change data to be output in a discrimination process and an input/output process in accordance with data passed to those processes, data input through those processes, and other optional conditions.

The vehicular air conditioning system may have a display apparatus (for example, a liquid crystal display or the like) for outputting an image under the control of the agent processing unit 6, and the agent processing unit 6 may control the display apparatus in such a way that it displays a predetermined image for each process in the input/output process and the discrimination process.

The agent processing unit 6 may collectively acquire plural pieces of word data continuously spoken or the like in one input process and one discrimination process. The agent processing unit 6 may specify under what concept plural pieces of word data collectively acquired are grouped to the same group, and use a part of or all of the acquired word data for use in a process only if the specified concept matches with the predetermined concept.

The trigger acquisition process and the discrimination process may activate (acquisition of trigger, establishment of a condition) only when a common concept represented by a plurality of words is obtained.

The agent processing unit 6 may comprise a plurality of data processing units (e.g., computers or the like) which are connected to one another and bear a flow formed generally by various processes, such as a trigger acquisition process, a discrimination process, and an input/output process, and wires. In this case, it is sufficient that each data processing unit which constitutes the speech synthesis processing unit 3 stores data representing that portion in the overall flow executable by the speech synthesis processing unit 3 which is probably executed by the unit, as elements of the process item database or the wire database. If data to be stored by each data processing unit is such data which macro-defines that process which is executed by the data processing unit, it is easy to cause a plurality of data processing units to perform distributed processing.

The vehicular air conditioning system may plurally include the speech input unit 1, and the language analyzer 2 or the speech output unit 4. The speech input unit 1 may have a recording medium drive unit (e.g., a floppy (registered trademark) disk drive, a CD-ROM drive or an MO drive) which reads a waveform signal from a recording medium (e.g., a floppy (registered trademark) disk, a CD (Compact Disc), an MO (Magneto-Optical Disk)) where data representing speeches is recorded, and supplies the signal to the language analyzer 2.

A device control device according to the invention whose embodiment has been explained above can be realized not only by an exclusive system but also an ordinary computer system.

For example, The vehicular air conditioning system that executes the above-described processes can be constructed by installing a program for executing the operations of the speech input unit 1, the language analyzer 2, the speech synthesis processing unit 3, the speech output unit 4 and the agent processing unit 6 into a personal computer connected to the input/output target device group 5 from a recording medium where the program is stored. The personal computer that runs the program executes flows shown in FIG. 4 as processes equivalent to the operation of the vehicular air conditioning system in FIG. 1.

The program that allows a personal computer to perform the functions of the vehicular air conditioning system may be uploaded to, for example, a bulletin board system (BBS) of a communication line, and distributed via the communication line, or a carrier may be modulated with a signal representing the program, the acquired modulated wave may be transmitted, and a device which receives the modulated wave demodulates the modulated wave to restore the program. Then, the above-described processes can be executed by invoking the program, and running the program like other application programs under the control of the OS.

When the OS bears a part of the processes, or the OS constitutes a part of a single constituting element of the invention, a program excluding that part may be stored in a recording medium. In this case, it is also assumed that according to the invention, a program for executing the individual functions or steps to be executed by the computer is stored in the recording medium.

The invention claimed is:

1. A device control device for controlling a plurality of devices, each being controlled by use of numerical parameters, the device control device comprising:

constant storage means that stores in advance a phrase and a predetermined constant in association with each other;

speech recognition means that acquires speech data representing a speech, and performs speech recognition on said speech data, thereby specifying a candidate for a phrase included by said speech and computes a likelihood for each specified candidate; and device control means that specifies those devices which are controllable of said plurality of devices, and an amount of change of said numerical parameter based on the predetermined constant associated with the specified phrase and the likelihood that have been computed by said speech recognition means, and changes the numerical parameter by the specified amount of change to thereby control the specified devices, wherein said device control means controls a device when a number of said specified devices is one, and when there are a plurality of devices specified, said speech recognition means further acquires speech data to specify a candidate for the phrase and computes the likelihood, and said device control means specifies any one of the devices that are controllable, based on the predetermined constant associated with the specified phrase and likelihood computed by said speech recognition means, and controls said specified device.

2. The device control device according to claim 1, wherein when there are a plurality of devices specified, said device control means outputs data prompting a user to utter a speech that specifies any one of said controllable devices.

3. The device control device according to claim 1, wherein
said candidate for the phrase specified by said speech recognition means represents a meaning of increasing or decreasing said numerical parameter;
one of said plurality of devices is an audio device, and a numerical parameter for controlling said audio device is a sound volume; and
another device is a power window, and a numerical parameter for controlling said power window is an opening/closing amount of a window.

4. The device control device according to claim 1, wherein
said candidate for the phrase specified by said speech recognition means represents a meaning of increasing or decreasing said numerical parameter;
one of said plurality of devices is an air conditioner, and a numerical parameter for controlling said air conditioner is a temperature, and
another device is a power window, and a numerical parameter for controlling said power window is an opening/closing amount of a window.

5. The device control device according to claim 1, wherein
said candidate for the phrase specified by said speech recognition means represents a meaning of increasing or decreasing said numerical parameter;
one of said plurality of devices is an air conditioner, and a numerical parameter for controlling said air conditioner is a temperature, and
another device is an audio device, and a numerical parameter for controlling said audio device is a volume.

6. The device control device according to claim 1, wherein
said device control means computes a value represented by the predetermined constant multiplied by said likelihood, and specifies said controllable device and the amount of change of said numerical parameter, based on a candidate for a phrase that corresponds to the largest of the values.

7. A device control method for controlling a plurality of devices, each being controlled by use of numerical parameters, comprising:

a speech recognition step of acquiring speech data representing a speech, and performing speech recognition on said speech data, thereby specifying a candidate for a phrase included by said speech and computing a likelihood for each specified candidate; and a device control step of specifying those devices which are controllable of said plurality of devices, and an amount of change of said numerical parameter based on the predetermined constant associated with the specified phrase and the likelihood that have been computed in said speech recognition step, and changing the numerical parameter by the specified amount of change to thereby control the specified devices, wherein in said device control step, a device is controlled when a number of specified devices is one, and when there are a plurality of devices specified, said speech recognition step further acquires speech data to specify a candidate for the phrase and computes the likelihood, and said device control step specifies any one of the devices that are controllable, based on the predetermined constant associated with the specified phrase and the likelihood computed by said speech recognition means, and control said specified device.

8. A computer-readable recording medium storing a program which allows a computer that controls a plurality of devices by use of a numerical parameter, to execute:

a speech recognition step of acquiring speech data representing a speech, performing speech recognition on said speech data, thereby specifying a candidate for a phrase included by said speech and computing a likelihood for each specified candidate; and a device control step of specifying those devices which are controllable of said plurality of devices, and an amount of change of said numerical parameter based on the predetermined constant associated with the specified phrase and the likelihood that have been computed by said speech recognition step, and changing the numerical parameter by the specified amount of change to thereby control the specified devices, wherein said device control step controls a device when a number of specified devices is one, and when there are a plurality of devices specified, said speech recognition step further acquires speech data to specify a candidate for the phrase and computes the likelihood, and said device control step specifies any one of the devices that are controllable, based on the predetermined constant associated with the specified phrase and the likelihood computed by said speech recognition means, and controls said specified device.

* * * * *